US010228253B2

(12) United States Patent
Murata et al.

(10) Patent No.: US 10,228,253 B2
(45) Date of Patent: Mar. 12, 2019

(54) LOCATION DETECTING SYSTEM AND LOCATION DETECTING METHOD OF THE LOCATION DETECTING SYSTEM

(71) Applicant: MITSUBISHI HEAVY INDUSTRIES MECHATRONICS SYSTEMS, LTD., Kobe-shi, Hyogo (JP)

(72) Inventors: Hideaki Murata, Tokyo (JP); Kazuumi Kondo, Tokyo (JP); Tetsuya Adachi, Tokyo (JP); Ryota Hiura, Tokyo (JP)

(73) Assignee: MITSUBISHI HEAVY INDUSTRIES MACHINERY SYSTEMS, LTD., Kobe-Shi, Hyogo (JP)

( * ) Notice: Subject to any disclaimer, the term of this patent is extended or adjusted under 35 U.S.C. 154(b) by 233 days.

(21) Appl. No.: 15/117,824

(22) PCT Filed: Feb. 12, 2015

(86) PCT No.: PCT/JP2015/053830
§ 371 (c)(1),
(2) Date: Aug. 10, 2016

(87) PCT Pub. No.: WO2015/122459
PCT Pub. Date: Aug. 20, 2015

(65) Prior Publication Data
US 2016/0370189 A1 Dec. 22, 2016

(30) Foreign Application Priority Data
Feb. 14, 2014 (JP) .................................. 2014-026682

(51) Int. Cl.
*G01C 21/28* (2006.01)
*G01S 19/25* (2010.01)
(Continued)

(52) U.S. Cl.
CPC ............ *G01C 21/28* (2013.01); *G01S 5/0072* (2013.01); *G01S 5/0289* (2013.01); *G01S 19/05* (2013.01); *G01S 19/25* (2013.01)

(58) Field of Classification Search
CPC ..... G01C 21/28; G01S 5/0072; G01S 5/0289; G01S 19/05
(Continued)

(56) References Cited
U.S. PATENT DOCUMENTS 5,874,914 A * 2/1999 Krasner .................. G01S 19/05
342/357.29
2007/0024498 A1 * 2/2007 Korneluk ................ G01S 19/05
342/357.42

(Continued)

FOREIGN PATENT DOCUMENTS

JP H06-169267 6/1994
JP H08-248127 A 9/1996
(Continued)

OTHER PUBLICATIONS

PCT, "International Search Report for International Application No. PCT/JP2015/053830".
(Continued)

*Primary Examiner* — Harry K Liu
(74) *Attorney, Agent, or Firm* — Manabu Kanesaka; Benjamin Hauptman; Kenneth Berner

(57) ABSTRACT

In a location detecting system, an on-vehicle device is provided at each vehicle a location detecting unit detecting a location of the vehicle, a communication unit, and a CPU unit controlling the location detecting unit and the communication unit. Each of the on-vehicle devices includes a GPS trajectory information processing unit acquiring GPS trajectory information of each of the vehicles, the communication unit broadcasts requests for the GPS trajectory information,
(Continued)

the communication units of other vehicles transmit the held GPS trajectory information to the communication unit of one vehicle when a distance to the vehicle is less than a predetermined value, the GPS trajectory information processing unit passes the GPS trajectory information from the other vehicles to the location detecting unit, and the location detecting unit of the vehicle outputs the location information of the vehicle based on the GPS trajectory information.

10 Claims, 17 Drawing Sheets

(51) Int. Cl.
*G01S 19/05* (2010.01)
*G01S 5/00* (2006.01)
*G01S 5/02* (2010.01)

(58) Field of Classification Search
USPC .................................................. 342/357.42
See application file for complete search history.

(56) References Cited

U.S. PATENT DOCUMENTS

2009/0157635 A1* 6/2009 Fuchs .................... G01C 21/28

2011/0057836 A1* 3/2011 Ische ..................... G01S 5/0009
342/357.43
2013/0045759 A1* 2/2013 Smith .................... H04W 4/029
455/456.6
2013/0223626 A1* 8/2013 Edge ....................... H04W 4/06
380/270
2013/0335273 A1* 12/2013 Pakzad ................ G01C 21/206
342/458
2014/0274031 A1* 9/2014 Menendez ........ H04W 52/0209
455/426.1

FOREIGN PATENT DOCUMENTS

| JP | H10-75196 A | 3/1998 |
| JP | 2005-069767 A | 3/2005 |
| JP | 2012-251947 A | 12/2012 |
| JP | 2013-162454 A | 8/2013 |

OTHER PUBLICATIONS

PCT, "Written Opinion of the International Searching Authority for International Application No. PCT/JP2015/053830".
Japan Patent Office, "Office Action for Japanese Patent Application No. 2014-026682," dated Feb. 6, 2018.

* cited by examiner

FIG. 15
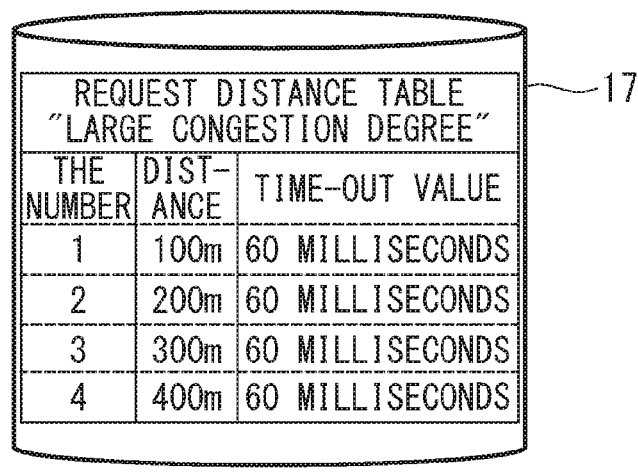
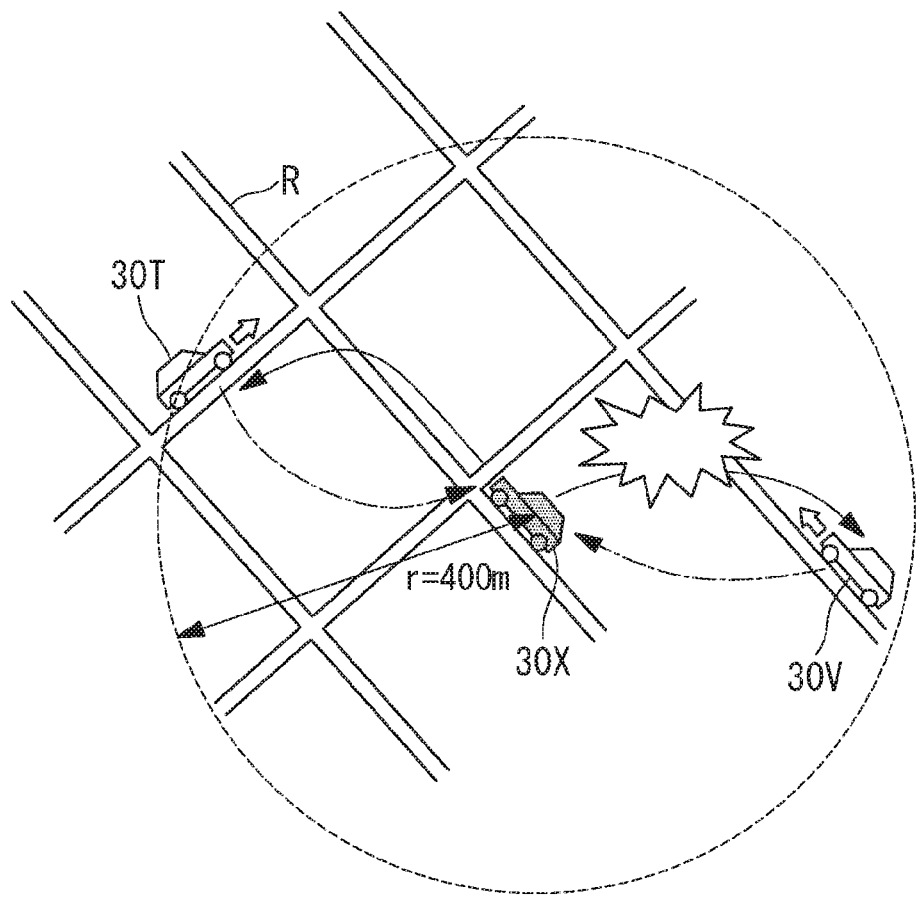

LOCATION DETECTING SYSTEM AND LOCATION DETECTING METHOD OF THE LOCATION DETECTING SYSTEM

RELATED APPLICATIONS

The present application is National Phase of International Application No. PCT/JP2015/053830 filed Feb. 12, 2015, and claims priority from Japanese Application No. 2014-026682, filed Feb. 14, 2014, the disclosure of which is hereby incorporated by reference herein in its entirety.

TECHNICAL FIELD

The present invention relates to a location detecting system for a mobile object and a location detecting method of the location detecting system.

BACKGROUND ART

A location detecting apparatus which acquires location information of a mobile object is applied to various mobile objects. When the location detecting apparatus is applied to a vehicle, an on-vehicle device mounted on the vehicle is responsible for acquiring location information of a mobile object.

In a next generation road pricing system, a flexible pricing system based on a travel distance, a time period while a vehicle stays within a specific area, or the like, is desired. To achieve this, it is necessary to detect correct location information of each vehicle. As means for detecting a location of a vehicle, a GPS (Global Positioning System) is mainly used as a feature of the on-vehicle device. This is a method which utilizes GPS trajectory information according to a GPS radio wave signal from a GPS satellite. It takes some time to perform communication with the GPS satellite to establish the GPS trajectory information. Particularly, it takes much time to detect location information for the first time after power activation. Therefore, it is desirable to shorten a time period required for acquiring the GPS trajectory information.

A time period required for outputting location information for the first time from power activation of the on-vehicle device is referred to as initial location calculation time. For example, if the vehicle starts moving before the initial location calculation time has elapsed after power activation, a route cannot be correctly obtained, and accounting cannot be performed correctly.

Therefore, as a method for shortening a time period required for acquiring the GPS trajectory information, in Patent Citation 1, broadcast stations for wireless LAN are provided at numerous locations, and information from the GPS satellite is transmitted to each vehicle via a wireless LAN broadcast station. Patent Citation 1 discloses a method of eventually enabling acquisition of the GPS trajectory information using exchange of high-speed communication.

Patent Citation 1: Japanese Unexamined Patent Application, Publication No. 2005-69767

DISCLOSURE OF INVENTION

With the invention disclosed in above-described Patent Citation 1, it is necessary to provide broadcast stations to use a wireless LAN. The problem is that it involves a significant cost to provide broadcast stations at numerous locations, and further, an operational cost is required.

The present invention has been made in view of such circumstances, and an object of the present invention is to provide a location detecting system which shortens a time period required for acquiring location information without provision of a new facility, and a location detecting method of the location detecting system.

To solve the above-described problem, a location detecting system and a location detecting method of the location detecting system of the present invention employ the following means.

According to a first aspect of the present invention, in a location detecting system in which a location detecting apparatus is provided at each of one mobile object and other mobile objects, the location detecting apparatus mounted on a mobile object and including a location detecting unit configured to detect a location of the mobile object, a communication unit configured to perform communication, and a CPU unit configured to control the location detecting unit and the communication unit, the location detecting apparatus detecting the location of the mobile object upon power activation, each location detecting apparatus includes a GPS trajectory information processing unit configured to acquire GPS trajectory information of each of the mobile objects, the communication unit of the one mobile object broadcasting a request for the GPS trajectory information to the communication units of the other mobile objects, the communication units of the other mobile objects transmit the held GPS trajectory information to the communication unit of the one mobile object when a distance to the one mobile object is equal to or less than a predetermined value, the GPS trajectory information processing unit of the one mobile object passes the GPS trajectory information from the other mobile objects to the location detecting unit, and the location detecting unit of the one mobile object outputs location information of the one mobile object based on the GPS trajectory information from the other mobile objects.

According to the present aspect, when the GPS trajectory information of the other mobile objects is obtained, location information of the one mobile object is output based on the acquired GPS trajectory information of the other mobile objects. As a result, even when it takes time to obtain the GPS trajectory information from a GPS satellite, it is possible to obtain the GPS trajectory information from a mobile object in the vicinity located within a distance equal to or less than a predetermined value, so that it is possible to shorten a time period required for acquiring location information.

Because a location is detected using the GPS trajectory information of the other mobile objects, it is not necessary to provide a fixed facility for broadcasting the GPS trajectory information, other than the GPS satellite, so that it is possible to reduce an installation cost and an operational cost.

Because a distance between the one mobile object and the other mobile objects is limited using a predetermined value, it is possible to prevent a failure in acquisition of the GPS trajectory information due to interference of communication by excessive responses from a plurality of mobile objects.

The communication unit of the above-described location detecting system may perform broadcasting when the location detecting apparatus mounted on the mobile object cannot utilize the GPS trajectory information acquired before power shutdown.

According to this location detecting system, the communication unit performs broadcasting when the location detecting apparatus cannot utilize the GPS trajectory information acquired before power shutdown. When the location detecting apparatus cannot utilize the GPS trajectory information acquired before power shutdown, it takes time to obtain the GPS trajectory information from the GPS satellite. According to the present aspect, it is possible to obtain the GPS trajectory information from a mobile object in the vicinity. When the GPS trajectory information can be utilized, it is possible to utilize the stored GPS trajectory information. As a result, it is possible to shorten a time period required for acquiring location information.

The predetermined value in the above-described location detecting system may be a response request distance designated by the GPS trajectory information processing unit of the one mobile object.

According to this location detecting system, the predetermined value which is a limit value of the distance between the one mobile object and the other mobile objects is designated as the response request distance by the GPS trajectory information processing unit of the one mobile object. As a result, it is possible to limit information of the other mobile objects received by the one mobile object. It is possible to prevent a failure in acquisition of the GPS trajectory information due to interference of communication by excessive responses from a plurality of mobile objects. It is also possible to arbitrarily set the predetermined value so that the response request distance can be changed.

The GPS trajectory information processing unit of the location detecting system may set a request time-out time period in the broadcasting, and, when the GPS trajectory information of the other mobile objects cannot be obtained within the request time-out time period, the GPS trajectory information processing unit may set the predetermined value larger in the next broadcasting.

According to this location detecting system, a request time-out time period is set when requests for the GPS trajectory information are broadcasted to a plurality of other mobile objects. When the GPS trajectory information of the other mobile objects cannot be obtained within the request time-out time period, the response request distance in the next broadcasting is set larger. As a result, if the GPS trajectory information of the other mobile objects cannot be obtained within a certain time period, it is possible to expand a range for searching for other mobile objects. Because the range is gradually expanded, it is possible to obtain the GPS trajectory information in ascending order of a distance to other mobile objects.

The GPS trajectory information processing unit of the above-described location detecting system has an upper limit of the number of times of the broadcasting, and, when the GPS trajectory information of the other mobile objects cannot be obtained even though the broadcasting is executed up to the number of times of the upper limit, the location detecting unit may output the location information of the one mobile object based on the GPS trajectory information acquired using a GPS radio wave signal from the GPS satellite.

According to this location detecting system, in the broadcasting, an upper limit is set for the number of times of broadcasting. As a result, the number of times the GPS trajectory information is acquired from the other mobile objects is limited, and, when the number of times exceeds the limit, it is possible to switch acquisition of the GPS trajectory information to acquisition from the GPS satellite. When the GPS trajectory information cannot be acquired from the other mobile objects through broadcasting, it is possible to acquire the GPS trajectory information and output the location information of the one mobile object.

The CPU unit of the above-described location detecting system may execute acquisition of the GPS trajectory information of the other mobile objects by the GPS trajectory information processing unit and acquisition of the GPS trajectory information using the GPS radio wave signal from the GPS satellite by the location detecting unit in parallel and may repeat the acquisition until either of the GPS trajectory information can be acquired.

According to this location detecting system, broadcasting and reception of the GPS radio wave signal from the GPS satellite are repeatedly performed in parallel until either of the GPS trajectory information can be acquired. As a result, because an opportunity or the number of times the other mobile objects move in the vicinity of the one mobile object increases, it becomes more likely to obtain the GPS trajectory information from other mobile objects. When acquisition of the GPS trajectory information from other mobile objects through broadcasting is failed, because reception from the GPS satellite is performed in parallel, it is possible to shorten a time period required for receiving the GPS radio wave signal from the GPS satellite.

The GPS trajectory information processing unit of the above-described location detecting system may detect the number of the other mobile objects in the vicinity of the one mobile object and set the predetermined value according to the number.

According to this location detecting system, the number of the other mobile objects in the vicinity of the one mobile object is detected, and the response request distance is set according to the number. When the mobile objects are densely located, the response request distance is made shorter. As a result, because a plurality of other mobile objects do not have to respond, the one mobile object can promptly acquire the GPS trajectory information from a mobile object in the vicinity. When the mobile objects are not densely located, if the response request distance is short, other mobile objects cannot be found even though search is performed in the vicinity, and useless communication is executed. By making the predetermined value larger, it is possible to obtain the GPS trajectory information without performing useless communication. For example, when the location detecting apparatus is driven by a battery, it is possible to extend a duration time period of the battery.

The number of other mobile objects in the vicinity of the one mobile object is detected as density. The density is detected by the communication unit of the one mobile object intercepting wireless communication of mobile objects in the vicinity and counting the number of the mobile objects in the vicinity.

The GPS trajectory information processing unit of the above-described location detecting system may set a larger value for the request time-out time period in accordance with increase of the predetermined value.

According to this location detecting system, a larger value is set for the request time-out time period in accordance with increase of the response request distance. When the response request distance is large, there is a higher possibility that the number of other mobile objects located within the response request distance increases, and collision of responses is highly likely to occur. According to the present aspect, by increasing an opportunity of communication by retransmission of a response, a possibility of success in acquisition of the GPS trajectory information is increased.

The GPS trajectory information processing unit of the above-described location detecting system may select the latest GPS trajectory information among all the GPS trajectory information from the other mobile objects acquired within the request time-out time period.

According to this location detecting system, the location information of the one mobile object is output based on the latest information among all the GPS trajectory information acquired from the other mobile objects until the request time-out time period has elapsed. As a result, it is possible to acquire the GPS trajectory information having a longer valid time period. In the present aspect, when travel is stopped and the location detecting apparatus is powered off, the GPS trajectory information is stored in a non-volatile memory. According to the present aspect, a possibility that the information is valid when the information is called upon next activation increases, so that accuracy of the location information is improved.

The mobile object of the above-described location detecting system may be a vehicle.

According to this location detecting system, the location detecting apparatus is mounted on the vehicle. When it takes time to receive the GPS radio wave signal from the GPS satellite, it is possible to obtain the GPS trajectory information from a vehicle in the vicinity. As a result, it is possible to shorten a time period required for acquiring the location information.

The location is detected using the GPS trajectory information of other mobile objects. It is not necessary to provide a fixed facility for broadcasting the GPS trajectory information, other than the GPS satellite. Further, it is possible to suppress an installation cost and an operational cost.

A distance between the one vehicle and the other vehicles is limited using a predetermined value. It is possible to prevent a failure in acquisition of the GPS trajectory information due to interference of communication by excessive responses from a plurality of vehicles.

According to a second aspect of the present invention, in a location detecting method of a location detecting system in which a location detecting apparatus is provided at each of one mobile object and other mobile objects, the location detecting apparatus being mounted on a mobile object and including a location detecting unit configured to detect a location of the mobile object, a communication unit configured to perform communication, and a CPU unit configured to control the location detecting unit and the communication unit, the location detecting apparatus detecting the location of the mobile object upon power activation, each location detecting apparatus includes a GPS trajectory information processing unit configured to acquire GPS trajectory information of each of the mobile objects, and the location detecting method includes a step of the communication unit of the one mobile object broadcasting requests for the GPS trajectory information to the communication units of the other mobile objects, a step of the communication units of the other mobile objects transmitting the held GPS trajectory information to the communication unit of the one mobile object when a distance to the one mobile object is equal to or less than a predetermined value, a step of the GPS trajectory information processing unit of the one mobile object passing the GPS trajectory information from the other mobile objects to the location detecting unit, and a step of the location detecting unit of the one mobile object outputting location information of the one mobile object based on the GPS trajectory information from the other mobile objects.

According to the present aspect, when the GPS trajectory information acquired before power shutdown cannot be utilized, if the GPS trajectory information of the other mobile object is obtained before a GPS radio wave signal is received from the GPS satellite, the location information of the one mobile object is output based on the acquired GPS trajectory information of the other mobile object. Even when it takes time to obtain the GPS trajectory information from the GPS satellite, it is possible to obtain the GPS trajectory information from the mobile object in the vicinity. According to the present aspect, it is possible to shorten a time period required for acquiring the location information.

The location is detected using the GPS trajectory information of the other mobile objects. It is not necessary to provide a fixed facility for broadcasting the GPS trajectory information, other than the GPS satellite. Further, it is possible to suppress an installation cost and an operational cost.

A distance between the one mobile object and the other mobile objects is limited using a predetermined value. It is possible to prevent a failure in acquisition of the GPS trajectory information due to interference of communication by excessive responses from a plurality of mobile objects.

According to the present invention, it is possible to output location information without the need of installation of a new facility. Further, it is possible to reduce an installation cost and an operational cost.

It is possible to output location information based on information from other mobile object in the vicinity of a mobile object. It is possible to shorten a time period required for acquiring location information compared to a case where a GPS radio wave signal from a GPS satellite is used.

BRIEF DESCRIPTION OF DRAWINGS

FIG. 4 is a flowchart illustrating main processing when the on-vehicle device according to the first embodiment of the present invention is powered on.

FIG. 11 is a flowchart illustrating processing when the on-vehicle device according to a second embodiment of the present invention is powered on.

FIG. 14 is a flowchart illustrating GPS trajectory information search pre-processing when the on-vehicle device according to the third embodiment of the present invention is powered on.

FIG. 15 is a schematic configuration diagram illustrating operation when collision of communication of an on-vehicle device according to a fourth embodiment of the present invention occurs.

FIG. 20 is a flowchart illustrating processing when the on-vehicle device according to the fifth embodiment of the present invention is powered on.

EXPLANATION OF REFERENCE

Figure 1:
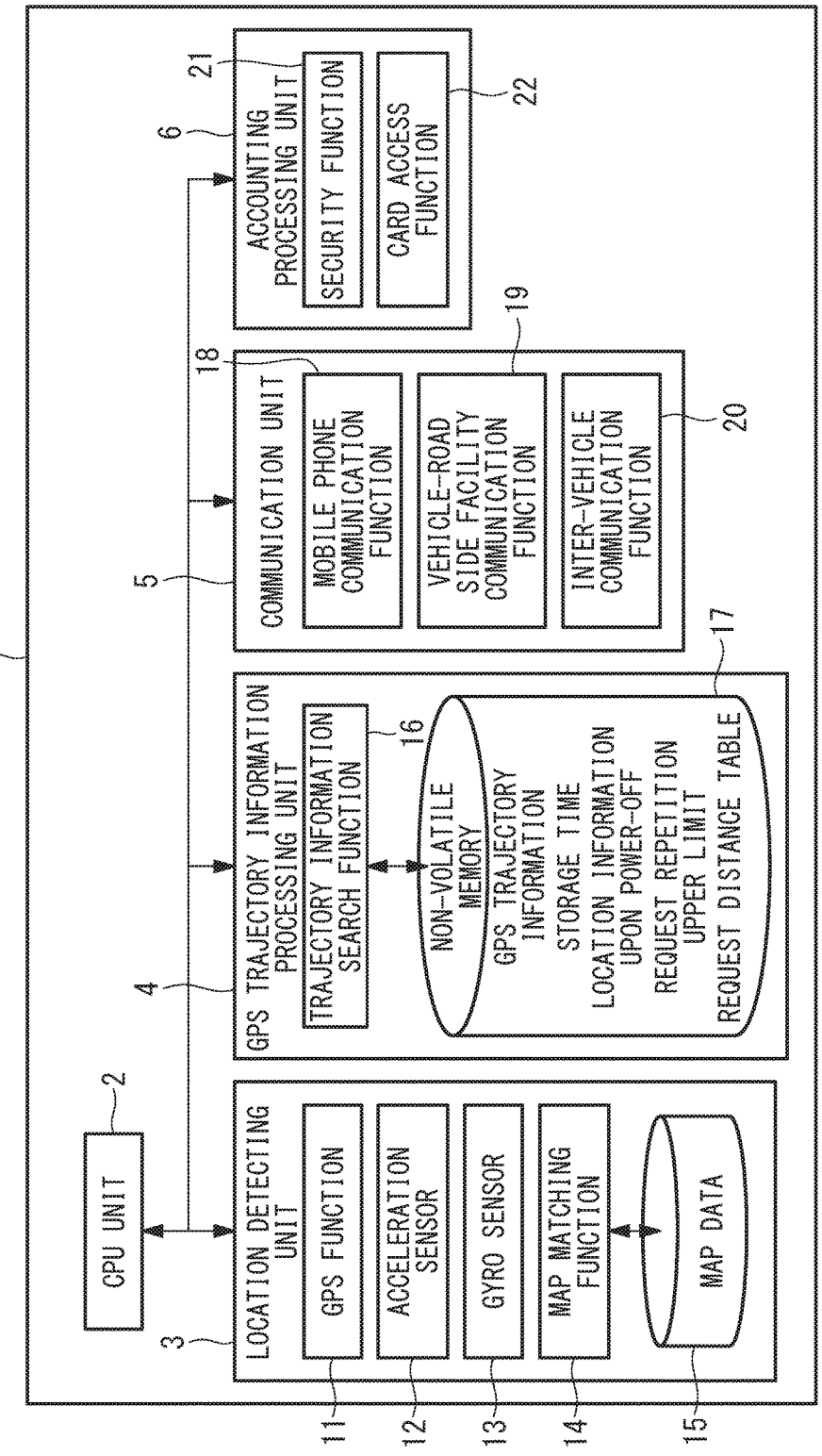
FIG. 1 is a block diagram illustrating a configuration of an on-vehicle device according to a first embodiment of the present invention.

1: on-vehicle device (location detecting apparatus)
2: CPU unit
3: location detecting unit
4: GPS trajectory information processing unit
5: communication unit
17: non-volatile memory
30: vehicle (mobile object)

DESCRIPTION OF EMBODIMENTS

Embodiments of a location detecting system and a location detecting method of the location detecting system according to the present invention will be described below with reference to the drawings.

First Embodiment

A first embodiment of the present invention will be described below using FIG. 1.

FIG. 1 illustrates a block diagram illustrating a configuration of an on-vehicle device according to the present embodiment.

As illustrated in FIG. 1, an on-vehicle device (location detecting apparatus) 1 includes a CPU unit 2, a location detecting unit 3, a GPS trajectory information processing unit 4, a communication unit 5 and an accounting processing unit 6 as main components.

The CPU unit 2 monitors and controls the overall processing of each component of the on-vehicle device 1.

The location detecting unit 3 includes a GPS function 11, an acceleration sensor 12, a gyro sensor 13 and a map matching function 14 including map data 15. The location detecting unit 3 estimates a location of the vehicle (mobile object) 30 in which the on-vehicle device 1 is mounted. The GPS function 11 calculates a location based on a radio wave signal received from a GPS satellite. The acceleration sensor 12 and the gyro sensor 13 obtain information (acceleration and an angle) for estimating a location from motion of the own vehicle when a radio wave cannot be received from the GPS satellite. The map matching function 14 corrects the location calculated from the GPS function 11, the acceleration sensor 12, and the gyro sensor 13 to match the location to a road on a map. The map matching function 14 improves location estimation accuracy. Data of a road, or the like, to be provided to the map matching function 14 is held as map data 15.

The communication unit 5 includes a mobile phone communication function 18, a vehicle-road side facility communication function 19, and an inter-vehicle communication function 20. The communication unit 5 performs communication between the on-vehicle device 1 and others. The mobile phone communication function 18 transmits a travel route to an accounting center for accounting. The vehicle-road side facility communication function 19 communicates with a facility provided at the road for fraud prevention. The inter-vehicle communication function 20 performs communication between the vehicles 30. For example, the inter-vehicle communication function 20 obtains approaching information from an emergency vehicle such as an ambulance.

The accounting processing unit 6 includes a security function 21 and a card access function 22. The security function 21 encrypts certification information of a regular terminal and deduction information of a payment. The card access function 22 accesses an IC card in which accounting information is stored.

The GPS trajectory information processing unit 4 includes a trajectory information search function 16 including a non-volatile memory 17. In the non-volatile memory 17, GPS trajectory information, a storage time, location information upon power-off, a request repetition upper limit and a request distance table are stored.

Figure 2:
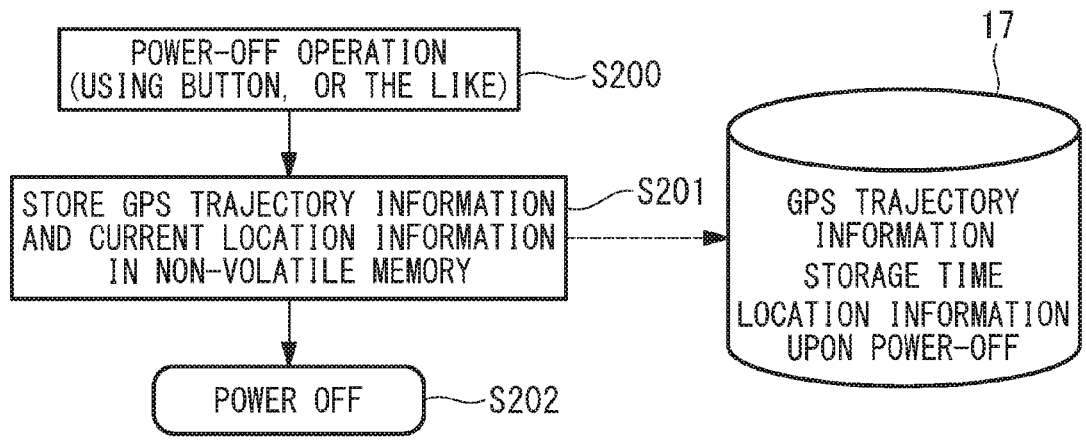
FIG. 2 is a flowchart illustrating processing when the on-vehicle device according to the first embodiment of the present invention is powered off.

FIG. 2 illustrates a flowchart illustrating processing when the on-vehicle device according to the present embodiment is powered off.

As illustrated in FIG. 2, first, power-off operation of the on-vehicle device 1 is performed using a button, or the like (S200). Then, GPS trajectory information and current location information of the vehicle 30 are stored in the non-volatile memory 17 along with a storage time by the trajectory information search function 16 (S201). The on-vehicle device 1 is then powered off (S202). Here, data stored in the non-volatile memory 17 has an expiration time period, for example, four hours. When a time period from power-off to power activation of the on-vehicle device 1 exceeds four hours, it is impossible to refer to the data.

When the data stored in the non-volatile memory 17 can be referred to upon power activation of the on-vehicle device 1, the data is utilized. When the data stored in the non-volatile memory 17 cannot be referred to, GPS trajectory information is obtained from a vehicle 30 travelling in the vicinity using the inter-vehicle communication function 20 of the communication unit 5.

Figure 3:
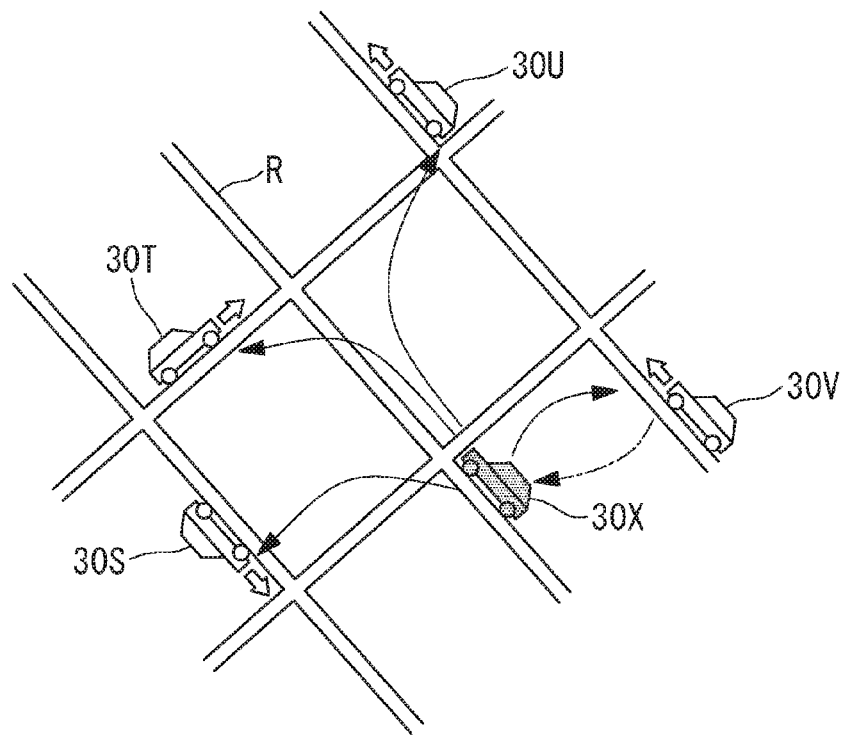
FIG. 3 is a schematic configuration diagram illustrating operation of the on-vehicle device according to the first embodiment of the present invention.

FIG. 3 illustrates a schematic configuration diagram illustrating operation of the on-vehicle device 1 according to the present embodiment. It is assumed that a vehicle 30X is a request source vehicle (one mobile object), and vehicles 30S, 30T, 30U and 30V are request destination vehicles (other mobile objects) travelling on a road R near the request source vehicle 30X. The on-vehicle device 1 is mounted on each of vehicles 30X, 30S, 30T, 30U and 30V. The request destination vehicles 30S, 30T, 30U and 30V, which are on travel, are travelling while the location detecting unit 3 is always executing location estimation. In the case of the present embodiment, when the request source vehicle 30X requests GPS trajectory information to the request destination vehicles 30S, 30T, 30U and 30V in the vicinity, the request destination vehicle 30V travelling within a request distance returns the GPS trajectory information to the request source vehicle 30X. Further, because the request destination vehicles 30S, 30T and 30U are travelling outside the request distance, the request destination vehicles 30S, 30T and 30U do not return the GPS trajectory information to the request source vehicle 30X.

Figure 4:
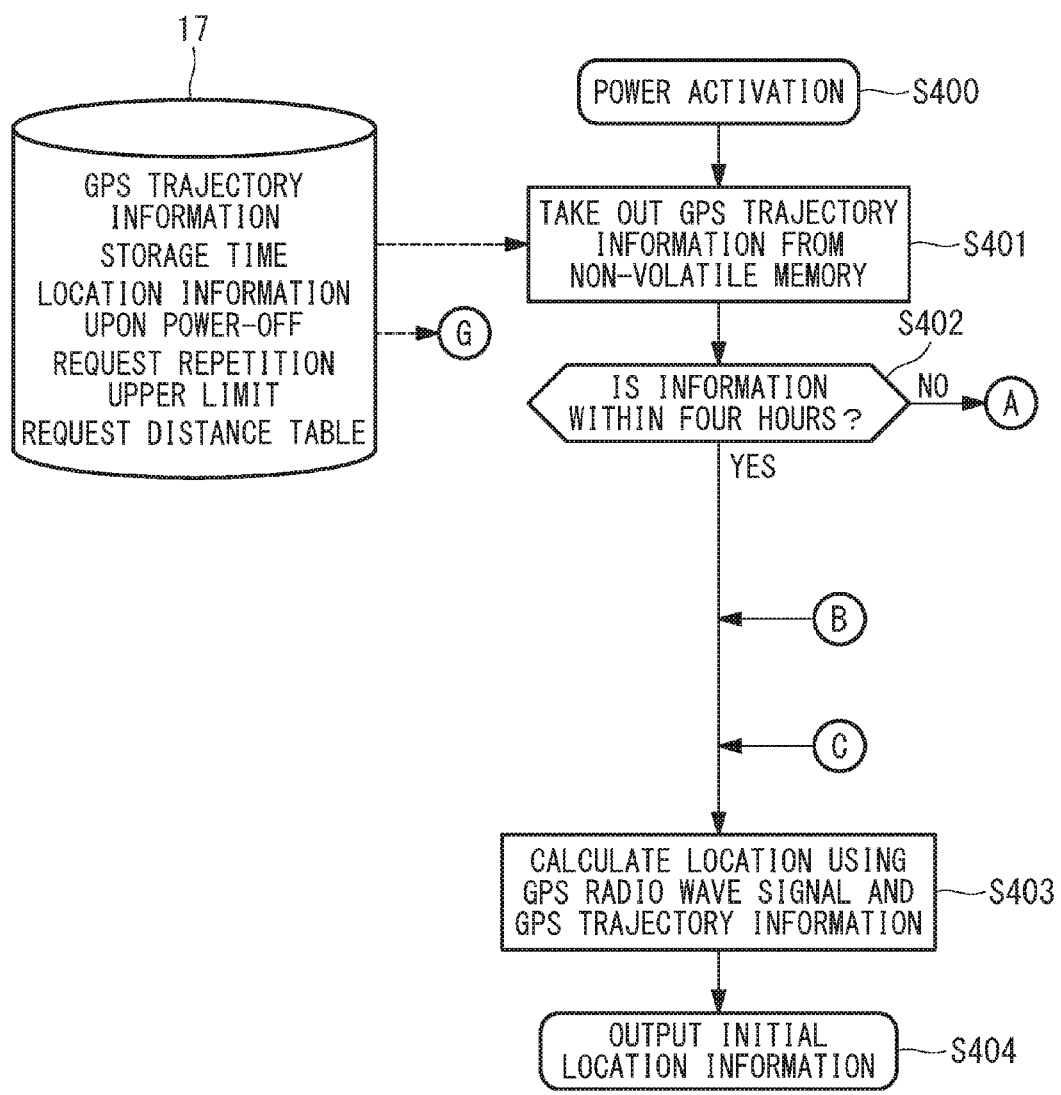
Figure 5:
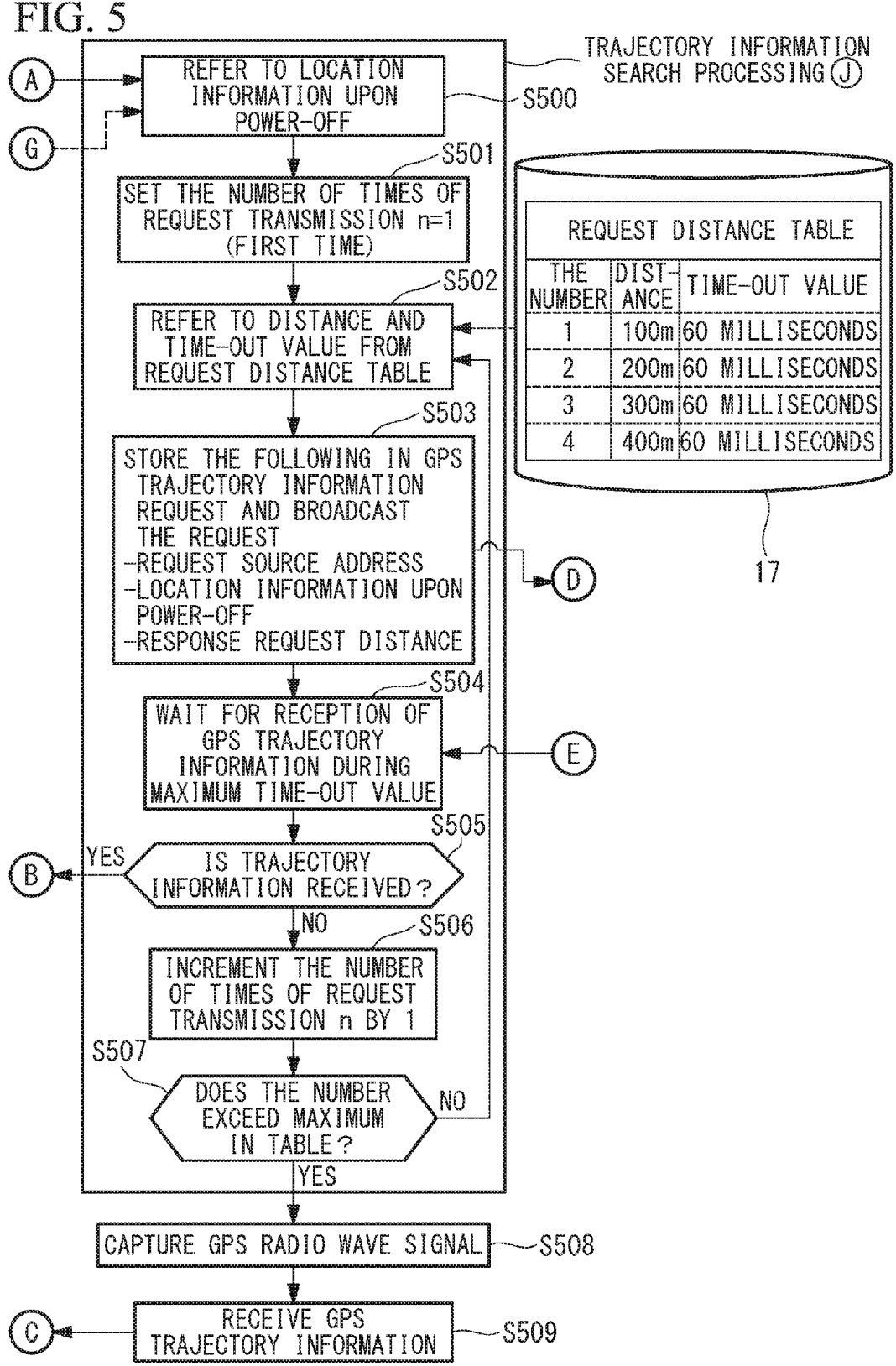
FIG. 5 is a flowchart illustrating trajectory information search processing of the on-vehicle device according to the first embodiment of the present invention.
Figure 6:
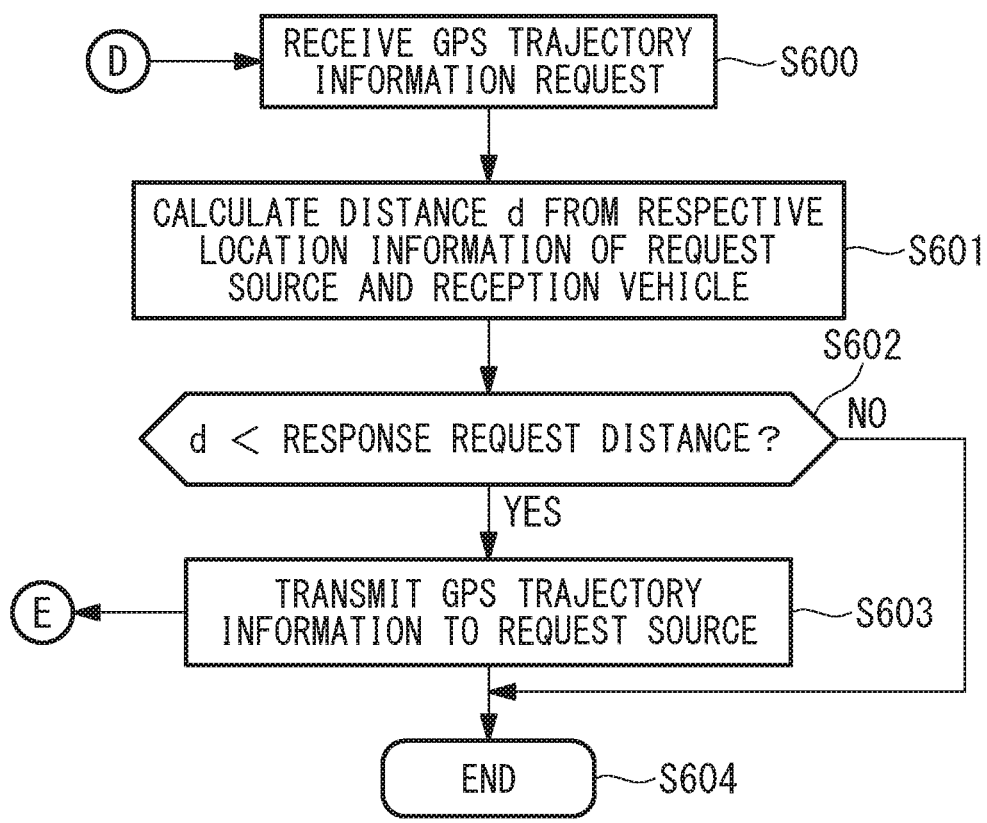
FIG. 6 is a flowchart illustrating inter-vehicle communication request destination processing of the on-vehicle device according to the first embodiment of the present invention.

Detailed processing of acquisition of the GPS trajectory information in the above-described on-vehicle device 1 will be described using the flowcharts in FIG. 4 to FIG. 6. FIG. 4, FIG. 5 and FIG. 6 are flowcharts obtained by dividing one flowchart illustrating detailed processing of acquisition of the GPS trajectory information in the on-vehicle device 1 into respective processing of main processing, inter-vehicle communication request source processing and inter-vehicle communication request destination processing.

FIG. 4 illustrates procedure of the main processing.

As illustrated in FIG. 4, first, the on-vehicle device 1 is powered on (S400). The on-vehicle device 1 takes out the GPS trajectory information stored in the non-volatile memory 17 upon previous power-off (see step S201 in FIG. 2) (S401). The on-vehicle device 1 refers to the storage time within the non-volatile memory 17 and compares a current time with the storage time to determine whether or not the current time is within four hours from the previous power-off of the on-vehicle device 1 (S402). When the storage time within the non-volatile memory 17 is within four hours from the previous power-off of the on-vehicle device 1, the on-vehicle device 1 calculates a location of the request source vehicle 30X based on the GPS trajectory information stored in the non-volatile memory 17 (S403). The on-vehicle device 1 then outputs the initial current location (initial location) (S404).

On the other hand, in the above-described step S402, when the storage time within the non-volatile memory 17 exceeds four hours from the previous power-off of the on-vehicle device 1, the processing transitions to A.

FIG. 5 illustrates procedure of the trajectory information search processing.

As illustrated in FIG. 5, first, the on-vehicle device 1 refers to the current location information upon power-off stored in the non-volatile memory 17 upon previous power-off of the on-vehicle device 1 (see step S201 in FIG. 2) (S500). The on-vehicle device 1 sets n=1 indicating the first time for the number of times of request transmission, which is the number of times a request for the GPS trajectory information is transmitted to each of the request destination vehicles 30 in the vicinity of the request source vehicle 30X (S501). Then, the on-vehicle device 1 refers to the request distance table stored in the non-volatile memory 17 (see FIG. 5), and refers to a request distance and a time-out value which is a request time-out time period corresponding to the number of times of request transition n=1 set in step S501 (S502). If the number of times of request transmission n is 1 (n=1), in the case of FIG. 5, the request distance is 100 m, and the time-out value is 60 milliseconds.

Subsequently, the on-vehicle device 1 broadcasts requests for the GPS trajectory information to request destination vehicles 30 in the vicinity of the respective request source vehicle 30X (S503). The on-vehicle device 1 waits for reception of the GPS trajectory information from the respective request destination vehicles 30 during the time-out value referred to in the above-described step S502 (S504). The request for the GPS trajectory information includes information of a request source address which is an address of the on-vehicle device 1 of the request source vehicle 30X, location information upon power-off of the request source, and a response request distance which is the request distance referred to in step S502. The requests for the GPS trajectory information are broadcasted without a designated request destination address. Communication to each request destination vehicle 30 transitions to D.

FIG. 6 illustrates procedure of the inter-vehicle communication request destination processing.

As illustrated in FIG. 6, each request destination vehicle 30 receives the request for the GPS trajectory information transmitted from the request source vehicle 30X in step S503 in FIG. 5 (S600). The on-vehicle device 1 calculates a distance d from the location information upon power-off in the request for the GPS trajectory information and the location information of each request destination vehicle 30 (S601).

Then, the on-vehicle device 1 determines whether or not the distance d calculated in step S601 is less than the response request distance in the request for the GPS trajectory information (S602). When the distance d is less than the response request distance in the request for the GPS trajectory information, that is, when the request destination vehicle 30 is located within the response request distance from the request source vehicle 30X, the request destination vehicle 30 transmits the GPS trajectory information held by the request destination vehicle 30 to the request source address (S603). Communication to the request source vehicle 30X transitions to E.

On the other hand, in the above-described step S602, when the distance d is equal to or greater than the response request distance in the request for the GPS trajectory information, the request destination vehicle 30 finishes processing without responding to the request source vehicle 30X (S604).

Figure 10:
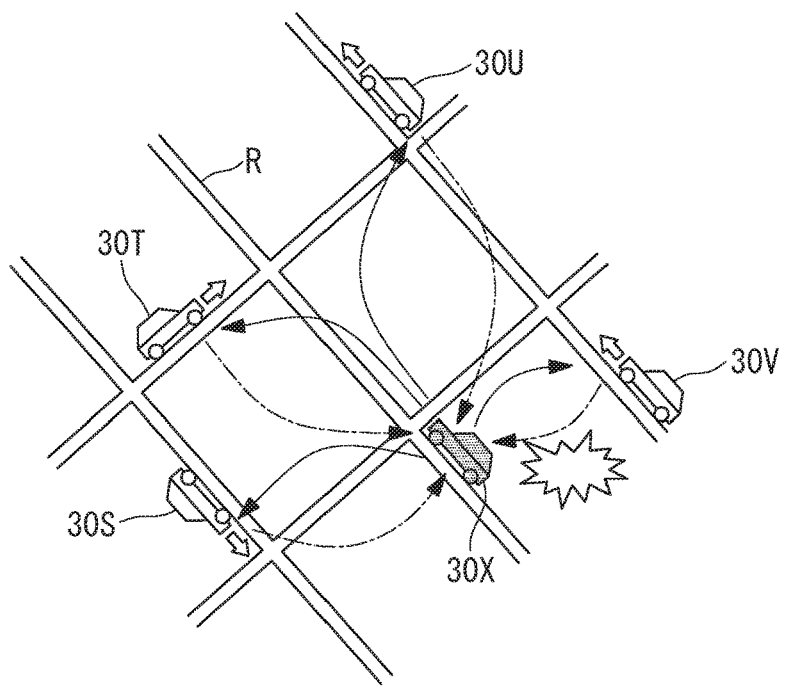
FIG. 10 is a schematic configuration diagram illustrating operation when there is no limitation in a response request distance of the on-vehicle device according to the first embodiment of the present invention.

In this manner, the requests for the GPS trajectory information are broadcasted to the plurality of request destination vehicles 30 travelling in the vicinity of the request source vehicle 30X by the on-vehicle device 1. In response to this, only the request destination vehicle 30V within the response request distance responds to the request source vehicle 30X. It is noted that the request source vehicle 30X can receive only one piece of information at one time. Therefore, for example, when the response request distance is not set, as illustrated in FIG. 10, all of the plurality of request destination vehicles 30S, 30T, 30U and 30V to which the requests for the GPS trajectory information reach from the request source vehicle 30X respond. Therefore, responses excessively interfere with each other, and communication is failed.

The on-vehicle device 1 of the request source vehicle 30 determines whether or not the GPS trajectory information returned from the request destination vehicle 30 in the above-described step S603 in FIG. 6 is obtained within the time-out value time period which is referred to in the above-described step S502 in FIG. 5 (S505). When the GPS trajectory information is obtained within the time-out value time period, the processing transitions to B.

On the other hand, when it is determined that the GPS trajectory information cannot be obtained within the time-out value time period in the above-described step S505, the on-vehicle device 1 increments the number of times of request transmission n stored in the non-volatile memory 17 by 1 (S506). The on-vehicle device 1 determines whether or not the set number of times of request transmission exceeds a maximum value in the request distance table (S507). When the set number of times of request transmission exceeds the maximum value, the on-vehicle device 1 captures a radio wave signal from the GPS satellite (S508). The on-vehicle device 1 executes reception of the GPS trajectory information (S509), and the processing transitions to C.

On the other hand, when it is determined that the number of times of request transmission does not exceed the maximum value in the request distance table in the above-described step S507, the processing transitions to step S502. The on-vehicle device 1 executes step S502 to step S506 up to the maximum number of times in the request distance table until the GPS trajectory information can be obtained from the request destination vehicle 30.

The GPS function 11 of the location detecting unit 3 of the on-vehicle device 1 mounted on the request source vehicle 30X outputs initial location information based on the GPS trajectory information from the GPS trajectory information processing unit 4 when the GPS trajectory information is obtained from the GPS trajectory information processing unit 4, that is, when the processing transitions from B in FIG. 4.

On the other hand, when the GPS trajectory information cannot be obtained from the GPS trajectory information processing unit 4, that is, when the processing transitions from C in FIG. 4, the GPS function 11 outputs initial location information based on a GPS radio wave signal from the GPS satellite.

Figure 7:
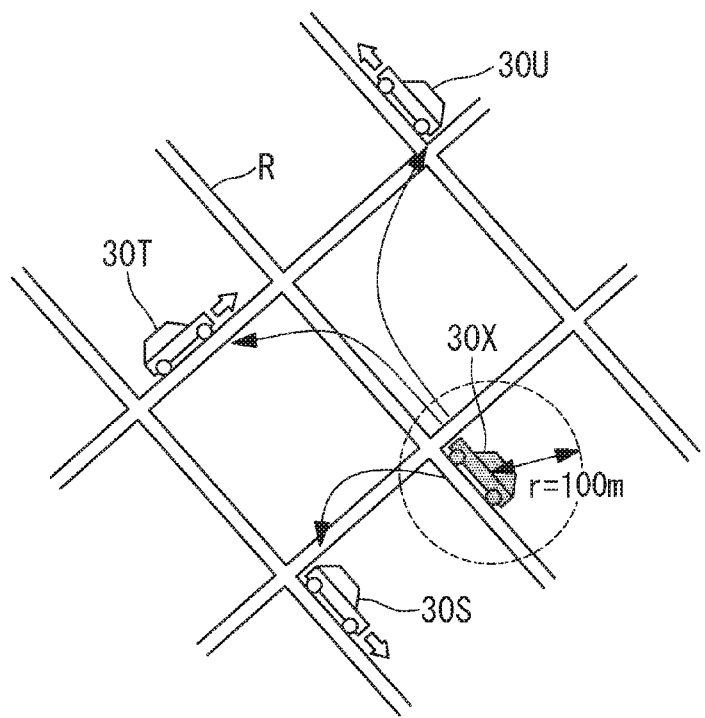
FIG. 7 is a schematic configuration diagram illustrating operation of the first time in the number of times of request transmission of the on-vehicle device according to the first embodiment of the present invention.
Figure 8:
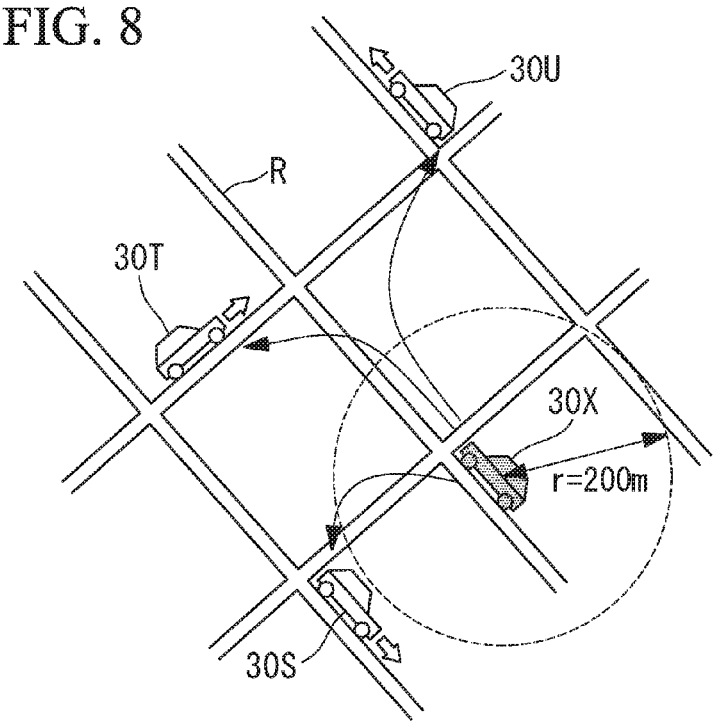
FIG. 8 is a schematic configuration diagram illustrating operation of the second time in the number of times of request transmission of the on-vehicle device according to the first embodiment of the present invention.
Figure 9:
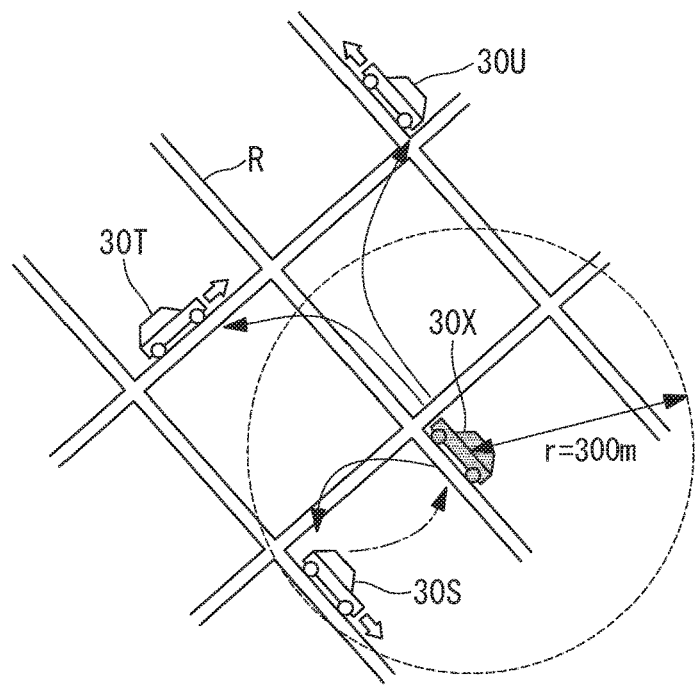
FIG. 9 is a schematic configuration diagram illustrating operation of the third time in the number of times of request transmission of the on-vehicle device according to the first embodiment of the present invention.

A specific operation example of the above-described flowcharts illustrated in FIG. 4 to FIG. 6 will be described using the schematic configuration diagrams illustrated in FIG. 7 to FIG. 9. FIG. 7, FIG. 8 and FIG. 9 are schematic configuration diagrams illustrating operation of the on-vehicle device 1 when the number of times of request transmission is respectively, n=1, 2, 3.

FIG. 7 illustrates a schematic configuration diagram illustrating operation of the first time in the number of times of request transmission of the on-vehicle device 1 according to the present embodiment. When the number of times of request transmission is 1, according to the request distance table in the non-volatile memory 17 in FIG. 5, the response request distance is 100 m.

Because none of the request destination vehicles 30S, 30T and 30U exists within 100 m which is the response request distance from the request source vehicle 30X, that is, a 100 m radius around the request source vehicle 30X, none of the request destination vehicles 30 respond.

Therefore, the request source vehicle 30X cannot receive the GPS trajectory information within the time-out value time period, and the number of times of request transmission n is incremented by 1, so that n is set at 2.

FIG. 8 illustrates a schematic configuration diagram illustrating operation of the second time in the number of times of request transmission of the on-vehicle device 1 according to the present embodiment. When the number of times of request transmission is 2, according to the request distance table in the non-volatile memory 17 in FIG. 5, the response request distance is 200 m.

Because none of the request destination vehicles 30S, 30T and 30U exists within 200 m which is the response request distance from the request source vehicle 30X, that is, a 200 m radius around the request source vehicle 30X, none of the request destination vehicles 30 responds.

Therefore, the request source vehicle 30X cannot receive the GPS trajectory information within the time-out value time period, and the number of times of request transmission n is incremented by 1, so that n is set at 3.

FIG. 9 illustrates a schematic configuration diagram illustrating operation of the third time in the number of times of request transmission of the on-vehicle device 1 according to the present embodiment. When the number of times of request transmission is 3, according to the request distance table in the non-volatile memory 17 in FIG. 5, the response request distance is 300 m.

Because the request destination vehicle 30S exists within 300 m which is the response request distance from the request source vehicle 30X, that is, a 300 m radius around the request source vehicle 30X, the request destination vehicle 30S returns the GPS trajectory information. Further, because the request destination vehicles 30T and 30U are located outside the response request distance, the request destination vehicles 30T and 30U do not respond.

Accordingly, the request source vehicle 30X outputs initial location information based on the GPS trajectory information of the request destination vehicle 30S.

As described above, according to the location detecting system and the location detecting method of the location detecting system according to the present embodiment, the following effects are provided.

When the GPS trajectory information of other vehicles 30 is obtained, location information of one vehicle 30 is output based on the acquired GPS trajectory information of the other vehicles 30. As a result, even when it takes time to obtain the GPS trajectory information from the GPS satellite, it is possible to obtain the GPS trajectory information from the vehicle 30 in the vicinity, located within a distance of equal to or less than a predetermined value, so that it is possible to shorten a time period required for acquiring location information.

Because the location is detected using the GPS trajectory information of other vehicles 30, it is not necessary to provide a fixed facility for broadcasting the GPS trajectory information, other than the GPS satellite, so that it is possible to suppress an installation cost and an operational cost.

Because the distance between the one vehicle 30 and other vehicles 30 is limited using a predetermined value, it is possible to prevent a failure in acquisition of the GPS trajectory information due to interference of communication by excessive responses from the plurality of vehicles 30.

The communication unit 5 performs broadcasting when the on-vehicle device 1 cannot utilize the GPS trajectory information acquired before power-off. When the GPS trajectory information acquired before power-off cannot be utilized, it takes time to obtain the GPS trajectory information from the GPS satellite. According to the present embodiment, it is possible to obtain the GPS trajectory information from the vehicle 30 in the vicinity. When the GPS trajectory information can be utilized, it is possible to utilize the stored GPS trajectory information. As a result, it is possible to shorten a time period required for acquiring location information.

The predetermined value which is a limit value of the distance between the one vehicle 30 and other vehicles 30 is designated by the GPS trajectory information processing unit 4 of the one vehicle 30 as the response request distance. As a result, it is possible to limit information of other vehicles 30 received by the one vehicle 30. It is possible to prevent a failure in acquisition of the GPS trajectory information due to interference of communication by excessive responses from the plurality of vehicles 30. Alternatively, it is also possible to arbitrarily set the predetermined value, so that the response request distance can be changed.

Further, in the broadcasting of requests for the GPS trajectory information to the on-vehicle devices 1 of a plurality of other vehicles 30, the request time-out time period is set. When the GPS trajectory information of other vehicles 30 cannot be obtained within the request time-out time period, the response request distance upon the next broadcasting is increased. As a result, if the GPS trajectory information of other vehicles 30 cannot be obtained within a certain time period, it is possible to expand a range for searching for other vehicles 30. Because the range is gradually expanded, it is possible to obtain the GPS trajectory information in ascending order of a distance to the other vehicles 30.

Further, in the broadcasting, the number of times has an upper limit. As a result, it is possible to set a limit to the number of times of acquisition of the GPS trajectory information from the other vehicles 30 and switch acquisition of the GPS trajectory information to acquisition from the GPS satellite when the number of times of acquisition exceeds the upper limit. When the GPS trajectory information cannot be acquired from the other vehicles 30 through the broadcasting, it is possible to acquire the GPS trajectory information and output location information of the one vehicle 30.

Second Embodiment

A second embodiment of the present invention will be described below using FIG. 11 and FIG. 12.

In the above-described first embodiment, after the request for the GPS trajectory information processing is finished, the GPS radio wave signal is captured. In the present embodiment, the request for the GPS trajectory information processing and capturing of the GPS radio wave signal are executed in parallel. Because the second embodiment is the same as the first embodiment in other points, the same reference numerals are assigned to the same components as those in the first embodiment, and explanation thereof will be omitted.

Figure 11:
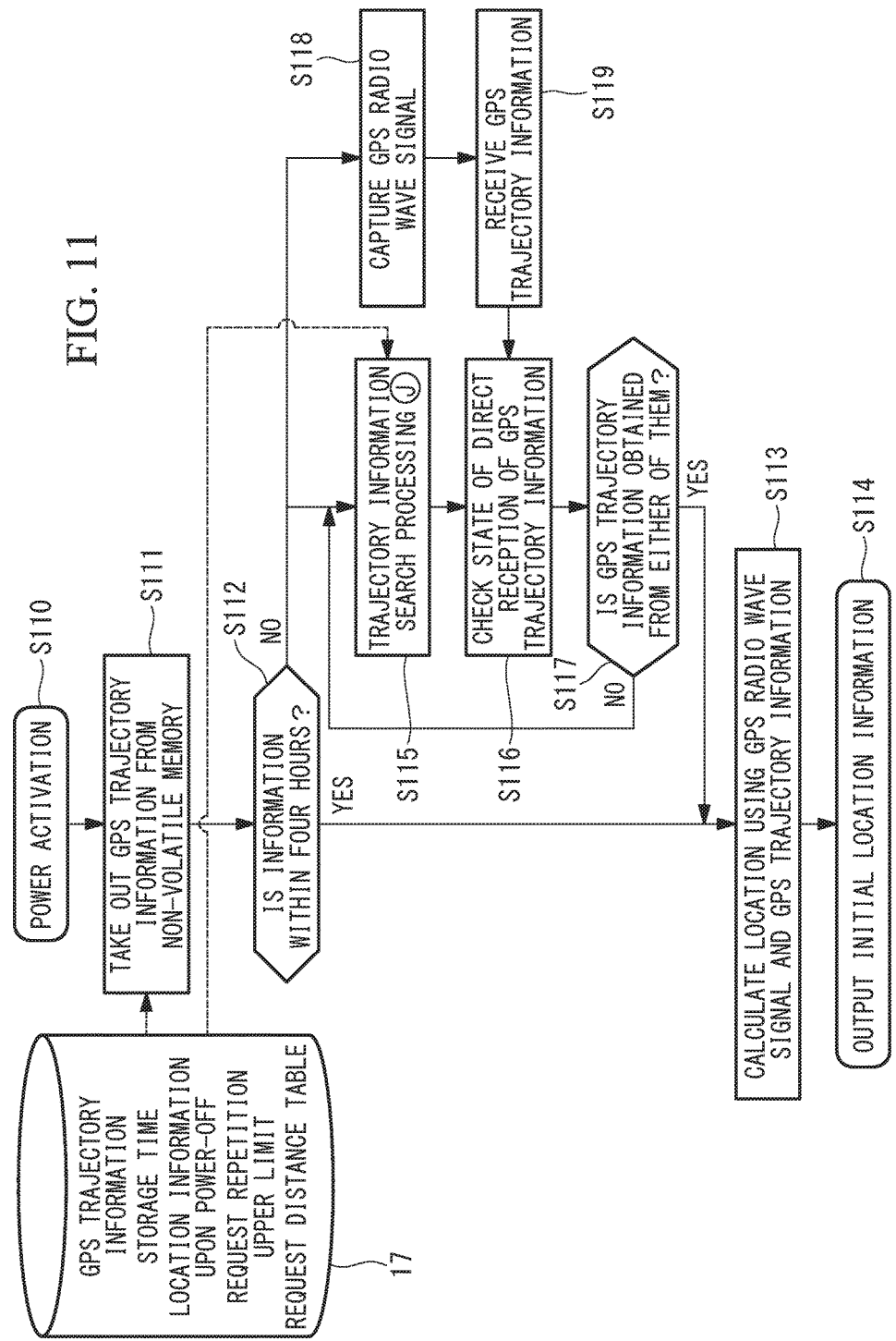

FIG. 11 illustrates a flowchart illustrating processing when the on-vehicle device 1 according to the present embodiment is powered on.

As illustrated in FIG. 11, first, the on-vehicle device 1 is powered on (S110). The on-vehicle device 1 takes out the GPS trajectory information stored in the non-volatile memory 17 upon previous power-off (see step S201 in FIG. 2) (S111). The on-vehicle device 1 then refers to the storage time in the non-volatile memory 17 and compares the storage time with a current time to determine whether or not the current time is within four hours from the previous power-off of the on-vehicle device 1 (S112). When the storage time within the non-volatile memory 17 is within four hours from the previous power-off of the on-vehicle device 1, the on-vehicle device 1 calculates a location of the request source vehicle 30 based on the GPS trajectory information stored in the non-volatile memory 17 (S113). Initial location information (initial location) is output to the on-vehicle device 1 (S114).

On the other hand, when, in the above-described step S112, the storage time within the non-volatile memory 17 exceeds four hours from the previous power-off of the on-vehicle device 1, the processing in step S115 and step S118 is executed in parallel.

In step S118, the on-vehicle device 1 captures a GPS radio wave signal from the GPS satellite and receives the GPS trajectory information (S119).

In step S115, the on-vehicle device 1 executes the trajectory information search processing J in FIG. 5. The on-vehicle device 1 then checks a reception state of the GPS trajectory information from the GPS satellite (S116). The on-vehicle device 1 determines whether or not the GPS trajectory information can be obtained through either step S115 or step S119 (S117). When it is determined in step S117 that the on-vehicle device 1 can obtain the GPS trajectory information, the processing transitions to step S113. The on-vehicle device 1 calculates a location of the request source vehicle 30 based on the obtained GPS trajectory information and outputs initial location information (initial location) (S114).

On the other hand, when it is determined in the above-described step S117 that the on-vehicle device 1 cannot obtain the GPS trajectory information, the processing returns to step S115. The on-vehicle device 1 performs processing of acquiring the GPS trajectory information until the GPS trajectory information can be obtained.

Figure 12:
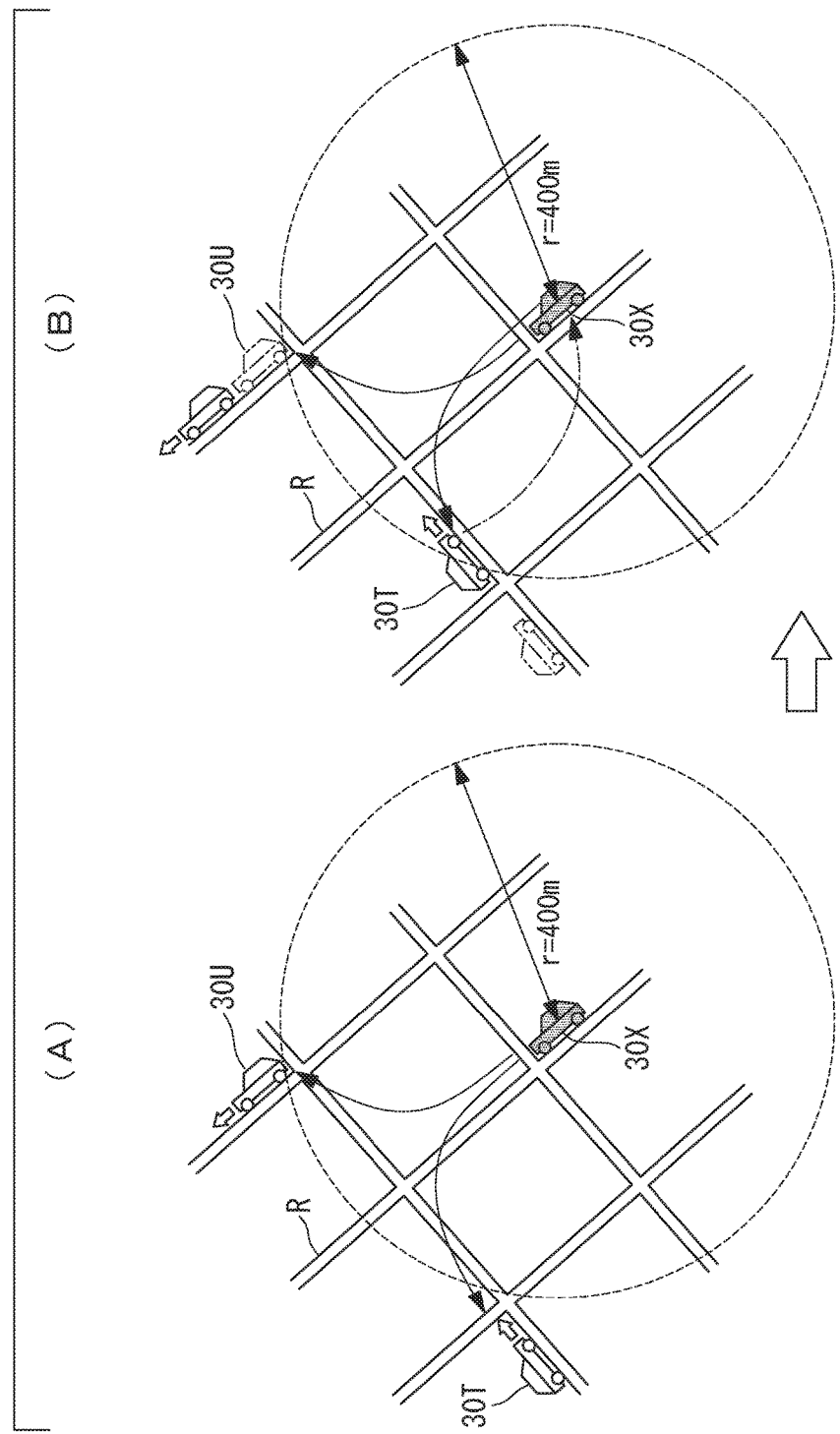
FIG. 12 is a schematic configuration diagram illustrating GPS trajectory information search operation of the on-vehicle device according to the second embodiment of the present invention.

FIG. 12 illustrates a schematic configuration diagram illustrating the GPS trajectory information search operation of the on-vehicle device 1 according to the present embodiment. Also in FIG. 12, it is assumed that the request distance table stored in the non-volatile memory 17 in FIG. 5 is used.

FIG. 12(A) illustrates an example where the on-vehicle device 1 cannot acquire the GPS trajectory information although request for the GPS trajectory information is performed up to the maximum number of times of request transmission n=4 of the request source vehicle 30X and up to the response request distance of 400 m.

In the present embodiment, when the GPS trajectory information including the GPS trajectory information from the GPS satellite cannot be acquired although request for the GPS trajectory information is performed up to the maximum number of times of request transmission (in the case of NO in step S117 in FIG. 11), processing of acquiring the GPS trajectory information and processing of capturing a GPS radio wave signal from the GPS satellite are performed again from the number of times of request transmission being set at n=1.

FIG. 12(B) illustrates an example where the on-vehicle device 1 requests for the GPS trajectory information for the second time up to the maximum number of times of request transmission n=4 of the request source vehicle 30X and up to the response request distance of 400 m. At this time, because the request destination vehicle 30T is travelling and located within the response request distance, the request destination vehicle 30T returns the GPS trajectory information to the request source vehicle 30X. The on-vehicle device 1 of the request source vehicle 30X outputs location information based on this GPS trajectory information.

As described above, according to the location detecting system and the location detecting method of the location detecting system according to the present embodiment, the following effects are provided.

The broadcasting and capturing of a GPS radio wave signal from the GPS satellite are executed in parallel and repeatedly performed until the GPS trajectory information of either of them can be acquired. Because an opportunity that other vehicles 30 move around the one vehicle 30 and the number of other vehicles 30 moving around the one vehicle 30 increase, it is more likely to obtain the GPS trajectory information from other vehicles 30. Even when acquisition of the GPS trajectory information from other vehicles 30 through the broadcasting is failed, because capturing of the GPS radio wave signal from the GPS satellite is performed in parallel, it is possible to shorten a time period required for receiving the GPS radio wave signal from the GPS satellite.

Third Embodiment

A third embodiment of the present invention will be described below using FIG. 13 and FIG. 14.

In the above-described first embodiment and second embodiment, one request distance table is provided. In the present embodiment, a plurality of request distance tables are provided according to the number of vehicles travelling in the vicinity. Because the third embodiment is the same as the first and the second embodiments in other points, the same reference numerals are assigned to the same components as those in the first and the second embodiments, and explanation thereof will be omitted.

Figure 13:
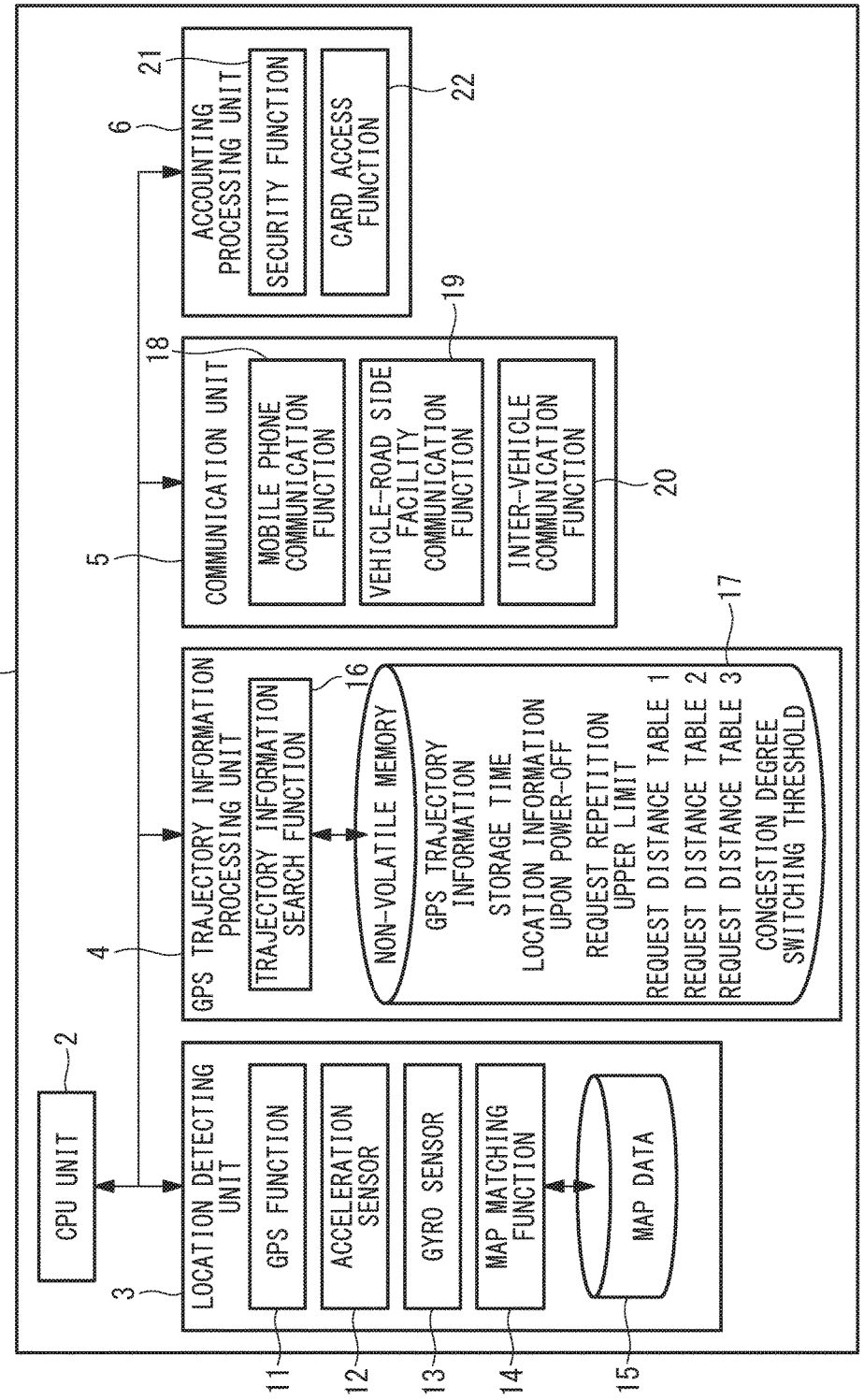
FIG. 13 is a block diagram illustrating a configuration of an on-vehicle device according to a third embodiment of the present invention.

FIG. 13 illustrates a block diagram illustrating a configuration of the on-vehicle device 1 according to the present embodiment.

As illustrated in FIG. 13, in the non-volatile memory 17 of the GPS trajectory information processing unit 4, in addition to the GPS trajectory information, the storage time, the location information upon power-off and the upper limit of request repetition, request distance tables 1, 2 and 3 and a congestion degree switching threshold are stored.

Figure 14:
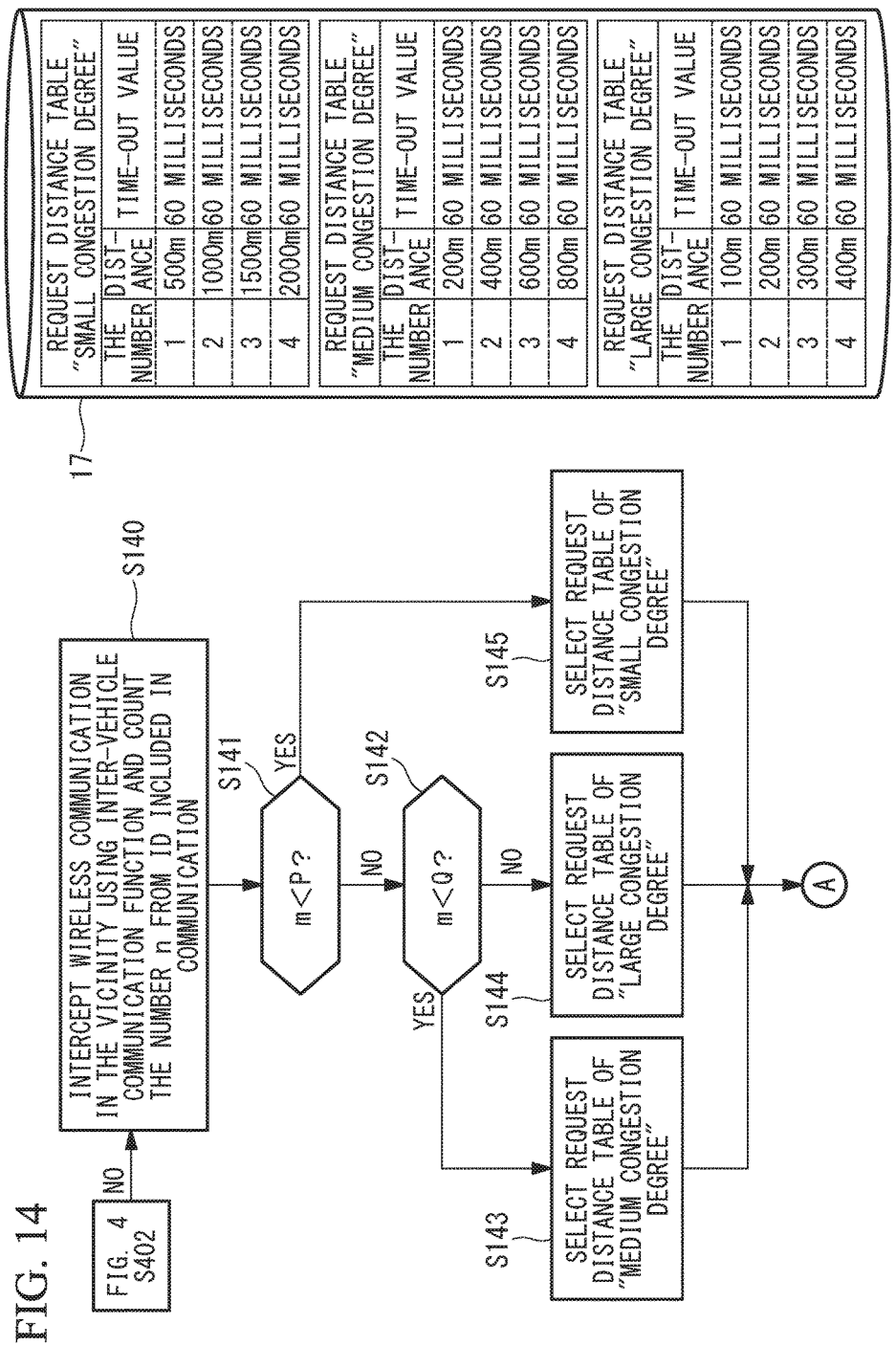

FIG. 14 illustrates a flowchart illustrating GPS trajectory information search pre-processing upon the on-vehicle device 1 according to the present embodiment is powered on.

As illustrated in FIG. 14, when it is determined as NO in step S402 in FIG. 4, the on-vehicle device 1 intercepts wireless communication in the vicinity of the request source vehicle 30X using the inter-vehicle communication function 20 of the communication unit 5. The on-vehicle device 1 counts the number m of vehicles 30 travelling in the vicinity from IDs included in the communication (S140). The number m of the vehicles 30 in the vicinity is detected as a congestion degree.

P and Q are used as congestion degree switching thresholds. It is assumed that Q is greater than P (P<Q), and, when m<P, the congestion degree is small, when P<m<Q, the congestion degree is medium, and, when Q m, the congestion degree is large. As illustrated in FIG. 14, in the non-volatile memory 17, a plurality of request distance tables in which values of the response request distance are set according to the congestion degrees are provided.

The on-vehicle device 1 determines whether or not the number m of the vehicles 30 travelling in the vicinity is smaller than P (S141). When m is smaller than P, the on-vehicle device 1 selects a request distance table of "small congestion degree" (S145). When there are a few vehicles 30 travelling in the vicinity of the request source vehicle 30X, such as in suburbs, the on-vehicle device 1 sets a large response request distance such as 500 m, 1000 m, 1500 m and 2000 m.

On the other hand, when m is equal to or greater than P in the above-described step S141, the on-vehicle device 1 determines whether or not m is less than Q (S142). When m is less than Q, the on-vehicle device 1 selects a request distance table of "medium congestion degree", and sets the response request distance such as 200 m, 400 m, 600 m and 800 m (S143).

On the other hand, when m is equal to or greater than Q in the above-described step S142, the on-vehicle device 1 selects a request distance table of "large congestion degree" (S144). Because there are many vehicles 30 travelling in the vicinity of the request source vehicle 30X in an area which is crowded with vehicles 30 such as in an urban area, the on-vehicle device 1 sets a small response request distance such as 100 m, 200 m, 300 m and 400 m.

The request distance table is selected according to the congestion degree as described above, and the processing transitions to A in FIG. 5.

As described above, according to the location detecting system and the location detecting method of the location detecting system according to the present embodiment, the following effects are provided.

The number of vehicles 30 in the vicinity of the one vehicle 30 is detected, the number is replaced with a congestion degree, and a response request distance is set according to the congestion degree. Because the response request distance is set smaller when the vehicles 30 are densely located, it is possible to promptly acquire the GPS trajectory information from a vehicle 30 in the vicinity without a number of other vehicles 30 making responses. Further, when the vehicles 30 are not densely located, if the response request distance is small, other vehicles 30 cannot be found even though searching is performed nearby, and useless communication is executed. By setting a predetermined value larger, it is possible to obtain the GPS trajectory information without performing useless communication. For example, when the on-vehicle device 1 is driven by a battery, it is possible to extend a duration of the battery.

Fourth Embodiment

A fourth embodiment of the present invention will be described below using FIG. 15 to FIG. 18.

In the above-described first to third embodiments, it is assumed that the time-out values in the request distance table are all the same. In the present embodiment, a time-out value is set larger for a larger response request distance. Because the fourth embodiment is the same as the first to the third embodiments in other points, the same reference numerals are assigned to the same components as those in the first to the third embodiments, and explanation thereof will be omitted.

Figure 16:
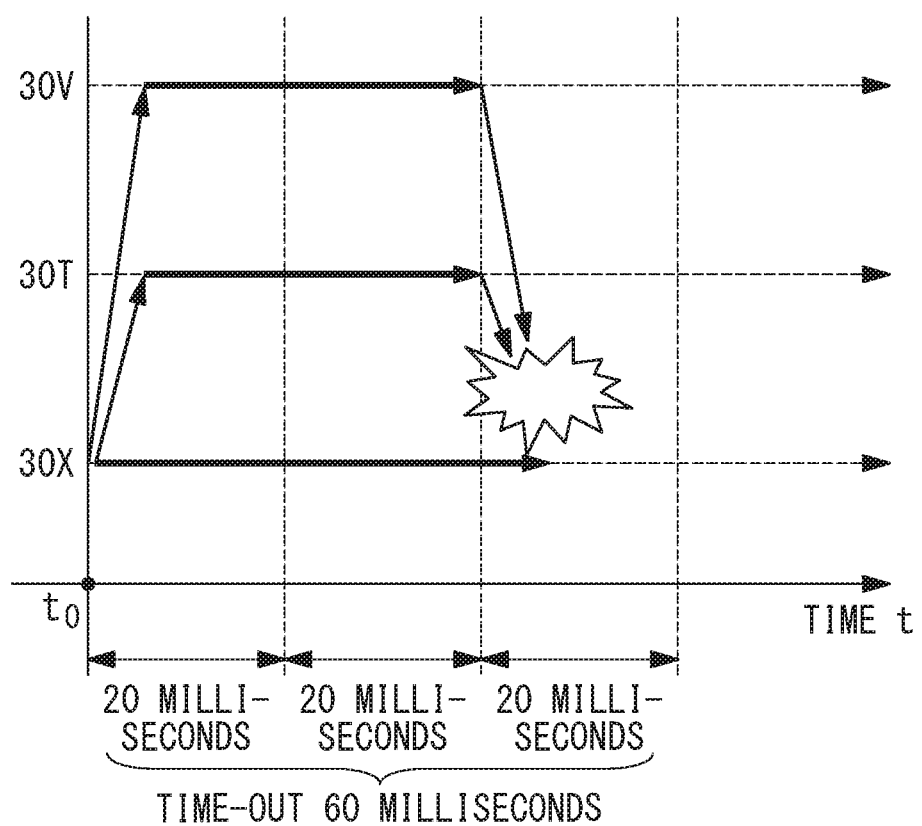
FIG. 16 is a graph illustrating elapsed time when collision of communication of the on-vehicle device according to the fourth embodiment of the present invention occurs.

FIG. 15 illustrates a schematic configuration diagram illustrating operation when communication of the on-vehicle device 1 according to the fourth embodiment collides. Further, FIG. 16 illustrates a graph illustrating elapsed time when communication of the on-vehicle device 1 according to the fourth embodiment collides.

As illustrated in FIG. 15, when the congestion degree is large and the number of times of request transmission n is 4 (n=4) at the request source vehicle 30X, the time-out value is 60 milliseconds, and the response request distance is 400 m. At this time, the request destination vehicles 30T and 30V return the GPS trajectory information. FIG. 16 illustrates this situation on a time axis. At time to, the requests for the GPS trajectory information are broadcasted from the request source vehicle 30X. At this time, the time-out value is 60 milliseconds. The vehicles 30T and 30V which receive the requests for the GPS trajectory information of the request source vehicle 30X take out the content as illustrated in the flow in FIG. 6 and determine whether or not the distance d is within the response request distance. Because the distance d is within the response request distance, the vehicles 30T and 30V respectively transmit responses. Because the request source vehicle 30X which waits for a response from the request destination vehicle 30 receives responses at the same time from the request destination vehicles 30T and 30V, the responses collide, and communication is failed.

To avoid such collision, in the present embodiment, the time-out value is set larger in accordance with increase of the response request distance.

Figure 17:
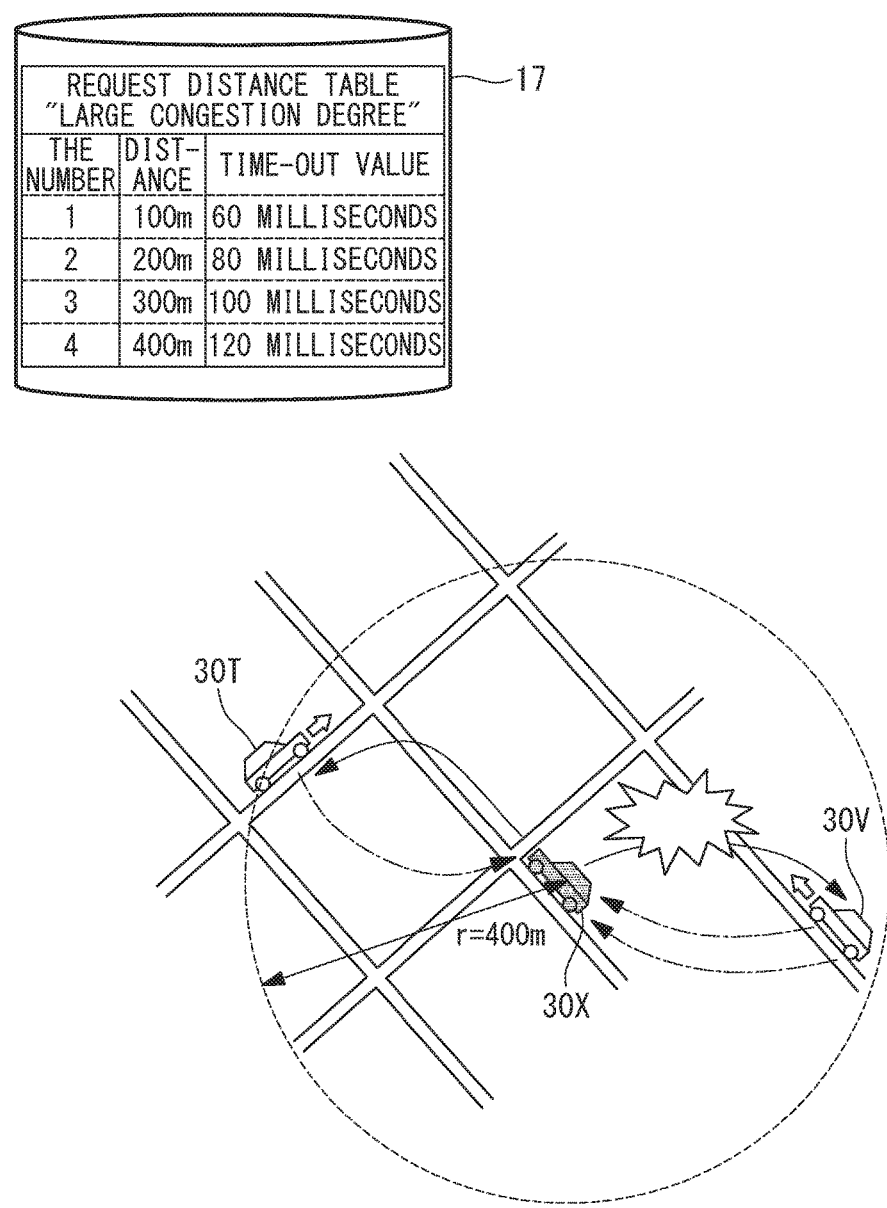
FIG. 17 is a schematic configuration diagram illustrating operation of retransmission of communication of the on-vehicle device according to the fourth embodiment of the present invention.
Figure 18:
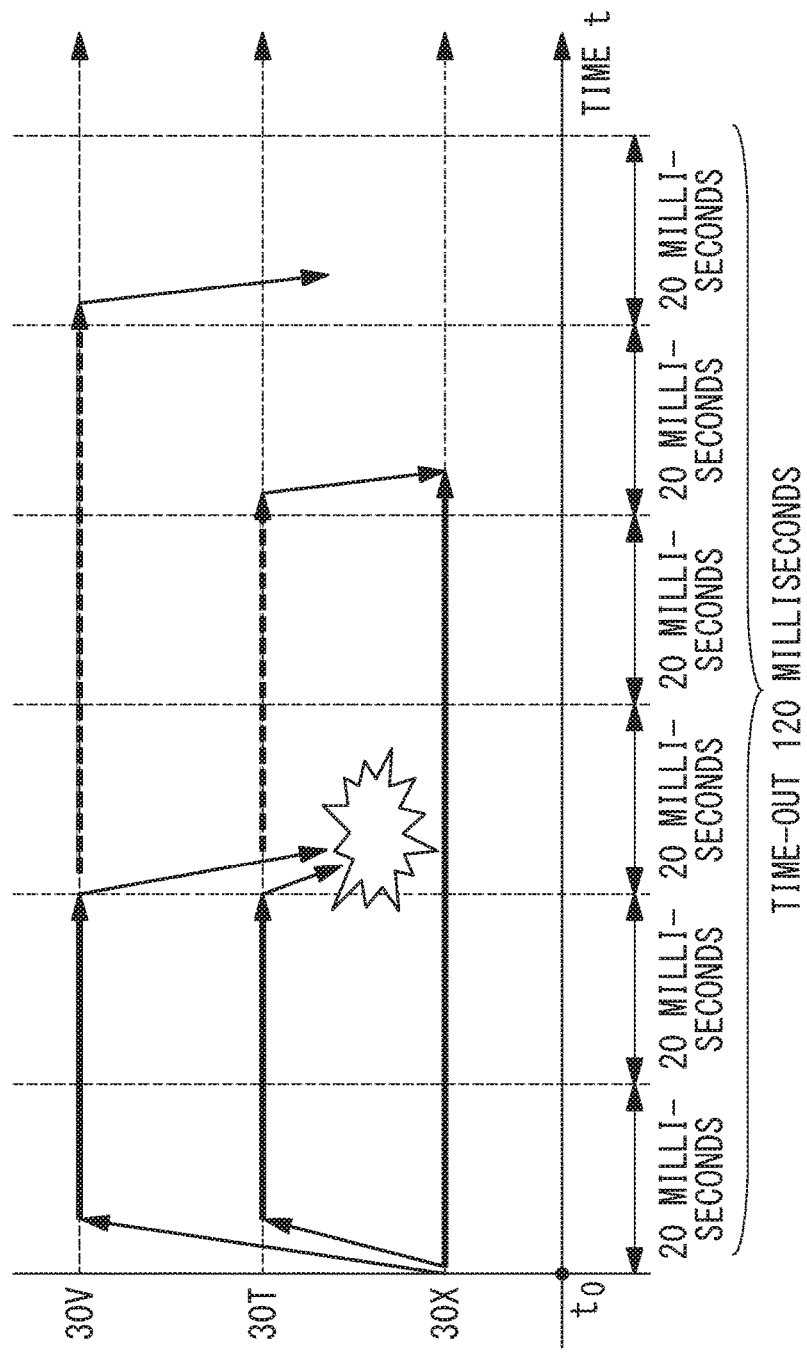
FIG. 18 is a graph illustrating elapsed time in retransmission of communication of the on-vehicle device according to the fourth embodiment of the present invention.

FIG. 17 illustrates a schematic configuration diagram illustrating operation of retransmission of communication of the on-vehicle device 1 according to the present embodiment. Further, FIG. 18 illustrates a graph illustrating elapsed time of retransmission of the communication of the on-vehicle device 1 according to the present embodiment.

As illustrated in FIG. 17, the time-out value of "large congestion degree" in the request distance table of the non-volatile memory 17 is set greater in accordance with increase of the response request distance, such as, at 60 milliseconds in the case of 100 m, 80 milliseconds in the case of 200 m, 100 milliseconds in the case of 300 m, and 120 milliseconds in the case of 400 m. In the request source vehicle 30X, when the congestion degree is large and the number of times of request transmission n is 4 (n=4), the time-out value is 120 milliseconds, and the response request distance is 400 m. At this time, the request destination vehicles 30T and 30V return the GPS trajectory information. FIG. 18 illustrates this situation on a time axis. At time to, the requests for the GPS trajectory information are broadcasted from the request source vehicle 30X. At this time, the time-out value is 120 milliseconds. The vehicles 30T and 30V which receive the requests for the GPS trajectory information from the request source vehicle 30X take out the content as illustrated in the flow in FIG. 6, and determine whether or not the distance d is within the response request distance. Because the distance d is within the response request distance, the vehicles 30T and 30V respectively transmit responses. The request source vehicle 30X which waits for a response from the request destination vehicle 30 receives the responses at the same time from the request destination vehicles 30T and 30V, the responses collide, and communication is failed.

Here, because the time-out value is long and 120 milliseconds, each request destination vehicle 30 can retransmit a response. Concerning retransmission, because a time interval to the next retransmission is determined using a random number for each request destination vehicle 30, a lag of the next retransmission execution time stochastically occurs. In the case of the present embodiment, because a time interval to the next retransmission of the request destination vehicle 30T is set at 40 milliseconds, and a time interval to the next retransmission of the request destination vehicle 30V is set at 60 milliseconds, collision in the retransmission is avoided. The GPS trajectory information of the request destination vehicle 30T, which is received by the request source vehicle 30X earlier, is selected, and communication succeeds. At this time, the response from the request destination vehicle 30V is not received because the communication of the request destination vehicle 30T has already succeeded.

As described above, according to the location detecting system and the location detecting method of the location detecting system according to the present embodiment, the following effects are provided.

The request time-out value is set larger in accordance with increase of the response request distance. When the response request distance is large, a possibility that the number of other vehicles 30 existing within the response request distance increases, and collision of responses is likely to occur. According to the present embodiment, because an opportunity for communication by retransmission of responses increases, a possibility of success in acquisition of the GPS trajectory information increases.

Fifth Embodiment

A fifth embodiment of the present invention will be described below using FIG. 19 and FIG. 20.

In the above-described fourth embodiment, the GPS trajectory information for which communication succeeds earlier is employed. In the present embodiment, among a plurality of pieces of the GPS trajectory information received within the time-out value time period, the latest information is employed. Because the fifth embodiment is the same as the fourth embodiment in other points, the same reference numerals are assigned to the same components as those in the fourth embodiment, and explanation thereof will be omitted.

Figure 19:
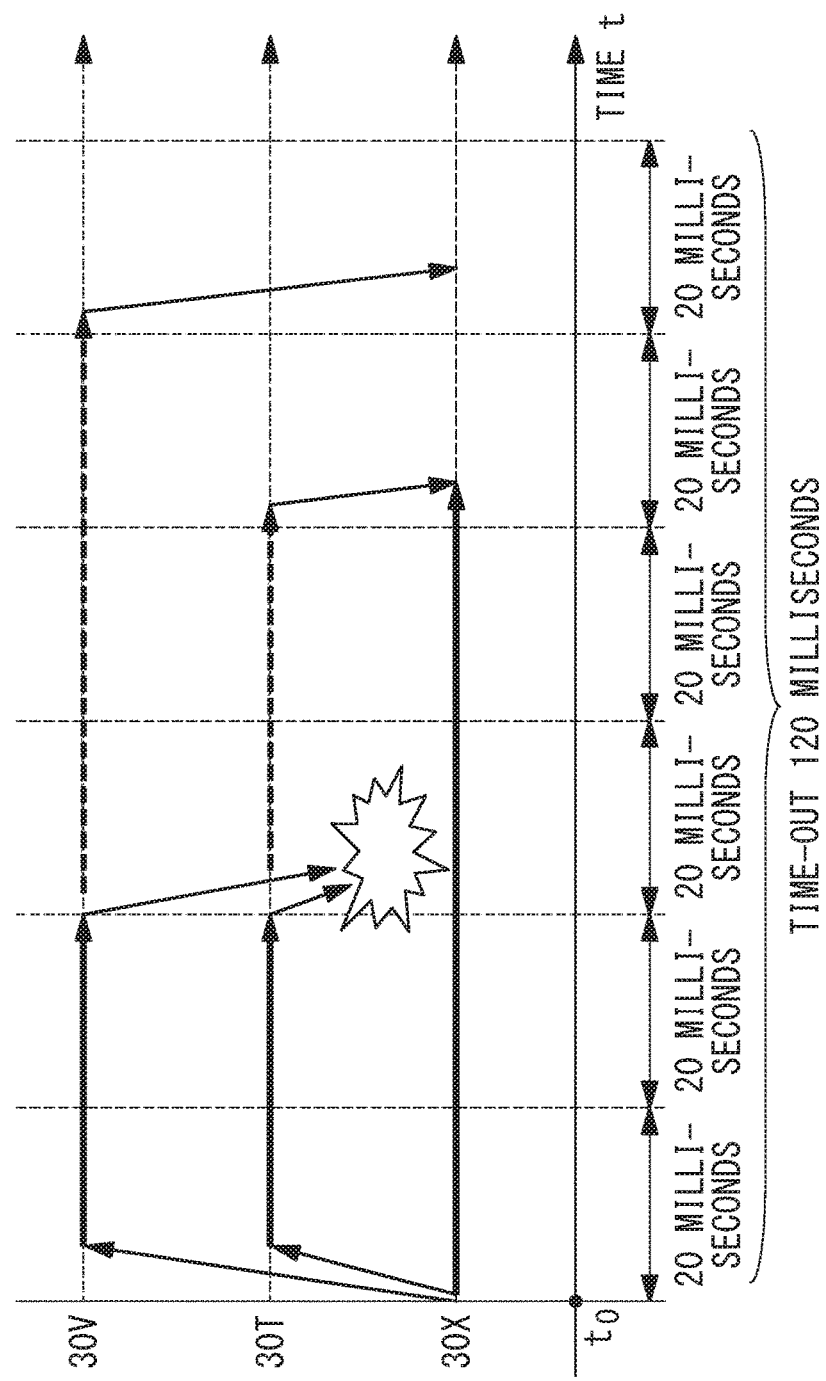
FIG. 19 is a graph illustrating elapsed time in retransmission of communication of an on-vehicle device according to a fifth embodiment of the present invention.

FIG. 19 illustrates a graph illustrating elapsed time of retransmission of communication of the on-vehicle device 1 according to the present embodiment.

As illustrated in FIG. 19, at time to, the requests for the GPS trajectory information are broadcasted from the request source vehicle 30X. At this time, the time-out value is 120 milliseconds. The vehicles 30T and 30V which receive the requests for the GPS trajectory information of the request source vehicle 30X take out the content and determine whether or not the distance d is within the response request distance as illustrated in the flow in FIG. 6. Because the distance d is within the response request distance, the vehicles 30T and 30V respectively transmit responses. Because the request source vehicle 30X which waits for a response from the request destination vehicle 30 receives responses at the same time from the request destination vehicles 30T and 30V, the responses collide, and communication is failed.

Here, because the time-out value is long and 120 milliseconds, each request destination vehicle 30 can retransmit a response. Concerning the retransmission, because a time interval to the next retransmission is determined using a random number for each request destination vehicle 30, a lag of the next retransmission execution time can stochastically occur. In the case of the present embodiment, because a time interval to the next retransmission of the request destination vehicle 30T is set at 40 milliseconds, and a time interval to the next retransmission of the request destination vehicle 30V is set at 60 milliseconds, collision in the retransmission is avoided.

The request source vehicle 30X first receives the GPS trajectory information of the request destination vehicle 30T, and later receives the GPS trajectory information of the request destination vehicle 30V within the time-out value time period. When the time-out value time period has elapsed, the request source vehicle 30X compares update times of a plurality of pieces of the received GPS trajectory information and selects the GPS trajectory information of the latest update time, in the case of the present embodiment, the GPS trajectory information of the request destination vehicle 30V.

Figure 20:
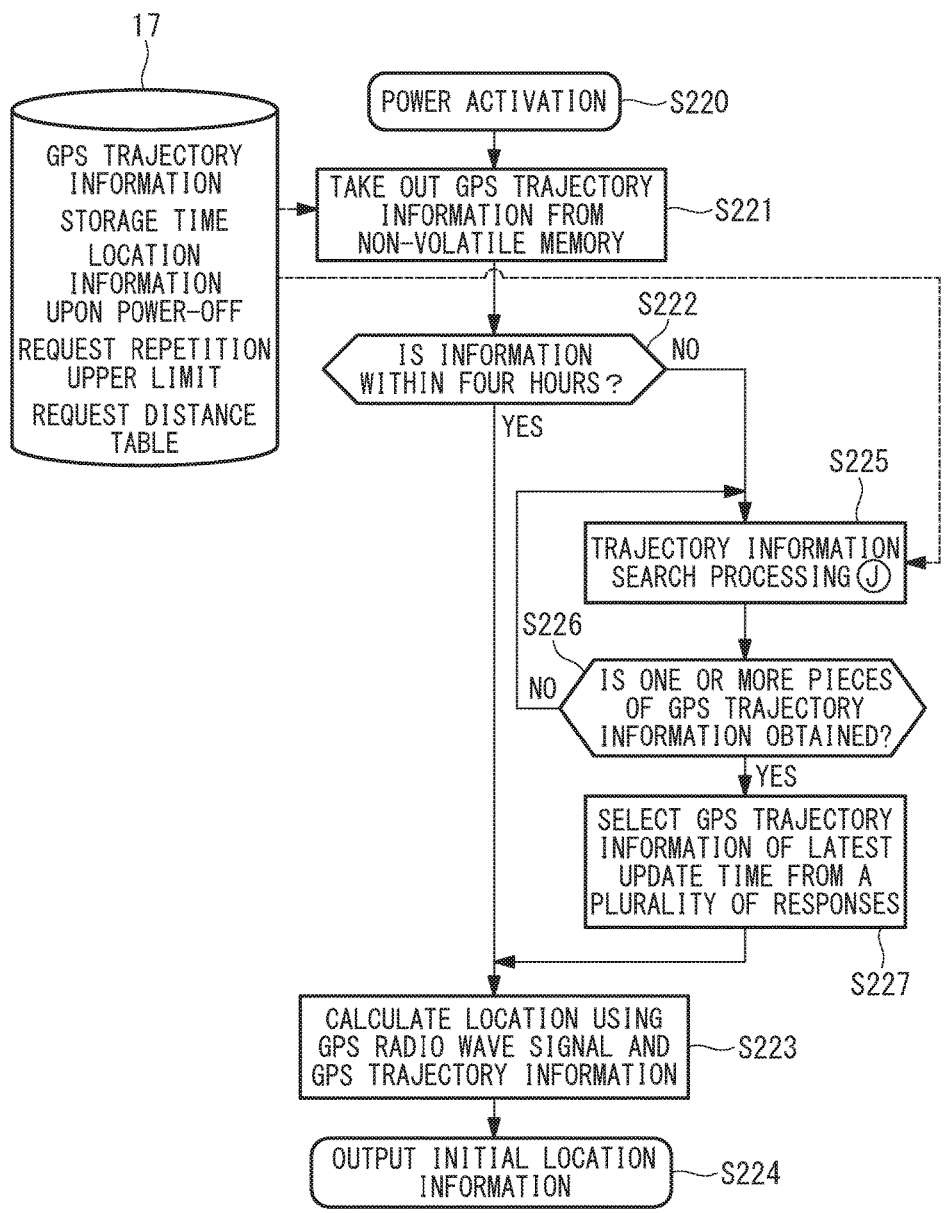

FIG. 20 illustrates a flowchart illustrating processing when the on-vehicle device 1 according to the present embodiment is powered on.

As illustrated in FIG. 20, first, the on-vehicle device 1 is powered on (S220). The on-vehicle device 1 takes out the GPS trajectory information stored in the non-volatile memory 17 upon the previous power-off (see step S201 in FIG. 2) (S221). The on-vehicle device 1 refers to a storage time within the non-volatile memory 17 and compares a current time with the storage time to determine whether or not the current time is within four hours from the previous power-off of the on-vehicle device 1 (S222). When the storage time within the non-volatile memory 17 is within four hours from the previous power-off of the on-vehicle device 1, the on-vehicle device 1 calculates a location of the request source vehicle 30X based on the GPS trajectory information stored in the non-volatile memory 17 (S223). The on-vehicle device 1 then outputs initial location information (initial location) (S224).

On the other hand, if, in the above-described step S222, the storage time within the non-volatile memory 17 exceeds four hours from the previous power-off of the on-vehicle device 1, the processing transitions to step S225.

In step S225, the on-vehicle device 1 executes the trajectory information search processing J in FIG. 5. The on-vehicle device 1 then determines whether or not one or more pieces of the GPS trajectory information can be obtained (S226). When the on-vehicle device 1 determines in step S226 that the GPS trajectory information can be obtained, the on-vehicle device 1 selects GPS trajectory information of the latest update time from the plurality of pieces of GPS trajectory information (S227). The processing transitions to step S223, and the on-vehicle device 1 calculates the location of the request source vehicle 30X based on the obtained GPS trajectory information and outputs initial location information (initial location) (S224).

On the other hand, when the on-vehicle device 1 determines in the above-described step S226 that the GPS trajectory information cannot be obtained, the processing returns to step S225, and the on-vehicle device 1 repeats request for the GPS trajectory information until one or more pieces of the GPS trajectory information can be obtained.

As described above, the location detecting system and the location detecting method of the location detecting system according to the present embodiment provide the following effects.

The location information of the one vehicle 30 is output based on the latest information among all the GPS trajectory information acquired from other vehicles 30 until the request time-out time period has elapsed. As a result, it is possible to acquire the GPS trajectory information having a longer valid time period. When travel is stopped and the on-vehicle device 1 is powered off, the on-vehicle device 1 stores the GPS trajectory information in the non-volatile memory 17. As a result, a possibility that the GPS trajectory information is valid when the GPS trajectory information is called upon next activation increases, so that accuracy of the location information is improved.

The invention claimed is:

1. A location detecting system in which a location detecting apparatus is provided at each of one mobile object and other mobile objects, the location detecting apparatus being mounted on a mobile object and comprising:
    a location detecting unit configured to detect a location of the mobile object,
    a communication unit configured to perform communication, and
    a CPU unit configured to control the location detecting unit and the communication unit,
    the location detecting apparatus detecting the location of the mobile object upon power activation,
    each of the location detecting apparatuses comprising a GPS trajectory information processing unit configured to acquire GPS trajectory information of each of the mobile objects,
    the communication unit of the one mobile object broadcasting a request for the GPS trajectory information to the communication units of the other mobile objects,
    the communication units of the other mobile objects transmitting the held GPS trajectory information to the communication unit of the one mobile object when a distance to the one mobile object is equal to or less than a predetermined value,
    the GPS trajectory information processing unit of the one mobile object passing the GPS trajectory information from the other mobile objects to the location detecting unit,
    the location detecting unit of the one mobile object outputting the location information of the one mobile object based on the GPS trajectory information from the other mobile objects, and
    the GPS trajectory information processing unit setting a request time-out time period in the broadcasting, wherein when the GPS trajectory information of the other mobile objects cannot be obtained within the request time-out time period, the predetermined value is set larger upon next broadcasting.

2. The location detecting system according to claim 1, wherein the communication unit performs the broadcasting when the location detecting apparatus mounted on the mobile object cannot utilize the GPS trajectory information acquired before power shutdown.

3. The location detecting system according to claim 1, wherein the predetermined value is a response request distance which is a distance from the one mobile object, designated by the GPS trajectory information processing unit of the one mobile object.

4. The location detecting system according to claim 1, wherein the GPS trajectory information processing unit sets a larger value for the request time-out time period in accordance with increase of the predetermined value.

5. The location detecting system according to claim 1, wherein the GPS trajectory information processing unit selects the latest GPS trajectory information from all the GPS trajectory information from the other mobile objects acquired within the request time-out time period.

6. The location detecting system according to claim 1, wherein the GPS trajectory information processing unit has an upper limit of the number of times of the broadcasting, and, when the GPS trajectory information of the other mobile objects cannot be obtained even when the broadcasting is executed up to the upper limit, the location detecting unit outputs the location information of the one mobile object based on the GPS trajectory information acquired using a GPS radio wave signal from a GPS satellite.

7. The location detecting system according to claim 1, wherein the CPU unit executes acquisition of the GPS trajectory information of the other mobile objects by the GPS trajectory information processing unit and acquisition of the GPS trajectory information using the GPS radio wave signal from the GPS satellite by the location detecting unit in parallel, and repeats the acquisition until either of the GPS trajectory information can be acquired.

8. The location detecting system according to claim 1, wherein the GPS trajectory information processing unit detects the number of the other mobile objects around the one mobile object and sets the predetermined value according to the number.

9. The location detecting system according to claim 1, wherein the mobile object is a vehicle.

10. A location detecting method of a location detecting system in which a location detecting apparatus is provided at each of one mobile object and other mobile objects, the location detecting apparatus being mounted on a mobile object and comprising a location detecting unit configured to detect a location of the mobile object, a communication unit configured to perform communication, and a CPU unit configured to control the location detecting unit and the communication unit, the location detecting apparatus detecting the location of the mobile object upon power activation, each of the location detecting apparatuses comprising a GPS trajectory information processing unit configured to acquire GPS trajectory information of each of the mobile objects, the location detecting method comprising:

a step of the communication unit of the one mobile object broadcasting requests for the GPS trajectory information to the communication units of the other mobile objects;

a step of the communication units of the other mobile objects transmitting the held GPS trajectory information to the communication unit of the one mobile object when a distance to the one mobile object is equal to or less than a predetermined value;

a step of the GPS trajectory information processing unit of the one mobile object passing the GPS trajectory information from the other mobile objects to the location detecting unit;

a step of the location detecting unit of the one mobile object outputting the location information of the one mobile object based on the GPS trajectory information from the other mobile objects; and a step of the GPS trajectory information processing unit setting a request time-out time period in the broadcasting, wherein when the GPS trajectory information of the other mobile objects cannot be obtained within the request time-out time period, the predetermined value is set larger upon next broadcasting.

* * * * *